(12) United States Patent
Kirsch et al.

(10) Patent No.: US 12,006,920 B2
(45) Date of Patent: Jun. 11, 2024

(54) SOLID-STATE-BASED ENERGY CONVERTER, HEATING/COOLING APPARATUS COMPRISING SUCH AN ENERGY CONVERTER, AND METHOD FOR OPERATING A HEATING/COOLING APPARATUS

(71) Applicant: UNIVERSITÄT DES SAARLANDES, Saarbrücken (DE)

(72) Inventors: Susanne-Marie Kirsch, Mettlach-Saarholzbach (DE); Felix Welsch, Sulzbach/Saar (DE); Stefan Seelecke, Saarbrücken (DE)

(73) Assignee: University of Saarland, Saarbrücken (DE)

( * ) Notice: Subject to any disclaimer, the term of this patent is extended or adjusted under 35 U.S.C. 154(b) by 338 days.

(21) Appl. No.: 17/612,920

(22) PCT Filed: May 18, 2020

(86) PCT No.: PCT/EP2020/063805
§ 371 (c)(1),
(2) Date: Nov. 19, 2021

(87) PCT Pub. No.: WO2020/234235
PCT Pub. Date: Nov. 26, 2020

(65) Prior Publication Data
US 2022/0228575 A1    Jul. 21, 2022

(30) Foreign Application Priority Data
May 22, 2019   (DE) .................... 10 2019 113 696.2

(51) Int. Cl.
*F03G 7/06*    (2006.01)
(52) U.S. Cl.
CPC ................................ *F03G 7/0614* (2021.08)

(58) Field of Classification Search
None
See application file for complete search history.

(56) References Cited

U.S. PATENT DOCUMENTS

| | | | | |
|---|---|---|---|---|
| 4,037,411 | A * | 7/1977 | Hochstein | ............... F03G 7/065 60/527 |
| 6,982,515 | B2 * | 1/2006 | Howell | .................. H01H 61/04 310/307 |

(Continued)

FOREIGN PATENT DOCUMENTS

| | | |
|---|---|---|
| DE | 102016118776 A1 | 4/2018 |
| DE | 102018200376 A1 | 7/2019 |
| WO | 2017097989 A1 | 6/2017 |

OTHER PUBLICATIONS

International Search Report dated Sep. 5, 2020, in International patent application No. PCT/EP2020/063805, 6 pages.

(Continued)

*Primary Examiner* — Shafiq Mian
(74) *Attorney, Agent, or Firm* — Blueshift IP; Robert Plotkin

(57) ABSTRACT

The invention relates to a thermoelastic energy converter (1), in particular for use in a thermoelastic heating/cooling apparatus or in a combined heat-and-power coupling system, comprising:
  an arrangement comprising multiple converter devices (3a, 3b), wherein each of the converter devices (3a, 3b) has one or more thermoelastic elements (4) arranged in a direction of extension;
  a loading device, in order to load the thermoelastic elements (4) of each of the multiple converter devices (3a, 3b) so as to have a temporally variable power curve;

(Continued)

a coupling which is designed such that the loading device actuates the converter devices (3a, 3b) in a phase-offset manner with respect to their cyclic loading and unloading.

24 Claims, 19 Drawing Sheets

(56) References Cited

U.S. PATENT DOCUMENTS

| | | | |
|---|---|---|---|
| 2012/0273768 A1* | 11/2012 | Ikeda | H10K 85/6574 |
| | | | 257/E51.025 |
| 2015/0362202 A1 | 12/2015 | Ikegami | |
| 2016/0131275 A1* | 5/2016 | Rodegheri | H10N 30/206 |
| | | | 29/25.35 |
| 2018/0283742 A1* | 10/2018 | Radermacher | F25B 23/00 |
| 2019/0032969 A1* | 1/2019 | Bartholome | F03G 7/062 |
| 2019/0178536 A1* | 6/2019 | Schroeder | F25D 11/00 |
| 2019/0264958 A1* | 8/2019 | Zerovnik | F25B 23/00 |
| 2022/0290659 A1* | 9/2022 | Britz | F03G 7/06 |

OTHER PUBLICATIONS

Hinnerk Ossmer, "Elastocaloric Microcooling," In: Elastocaloric Microcooling, Karlsruhe, Jan. 24, 2017, 244 pages.

\* cited by examiner

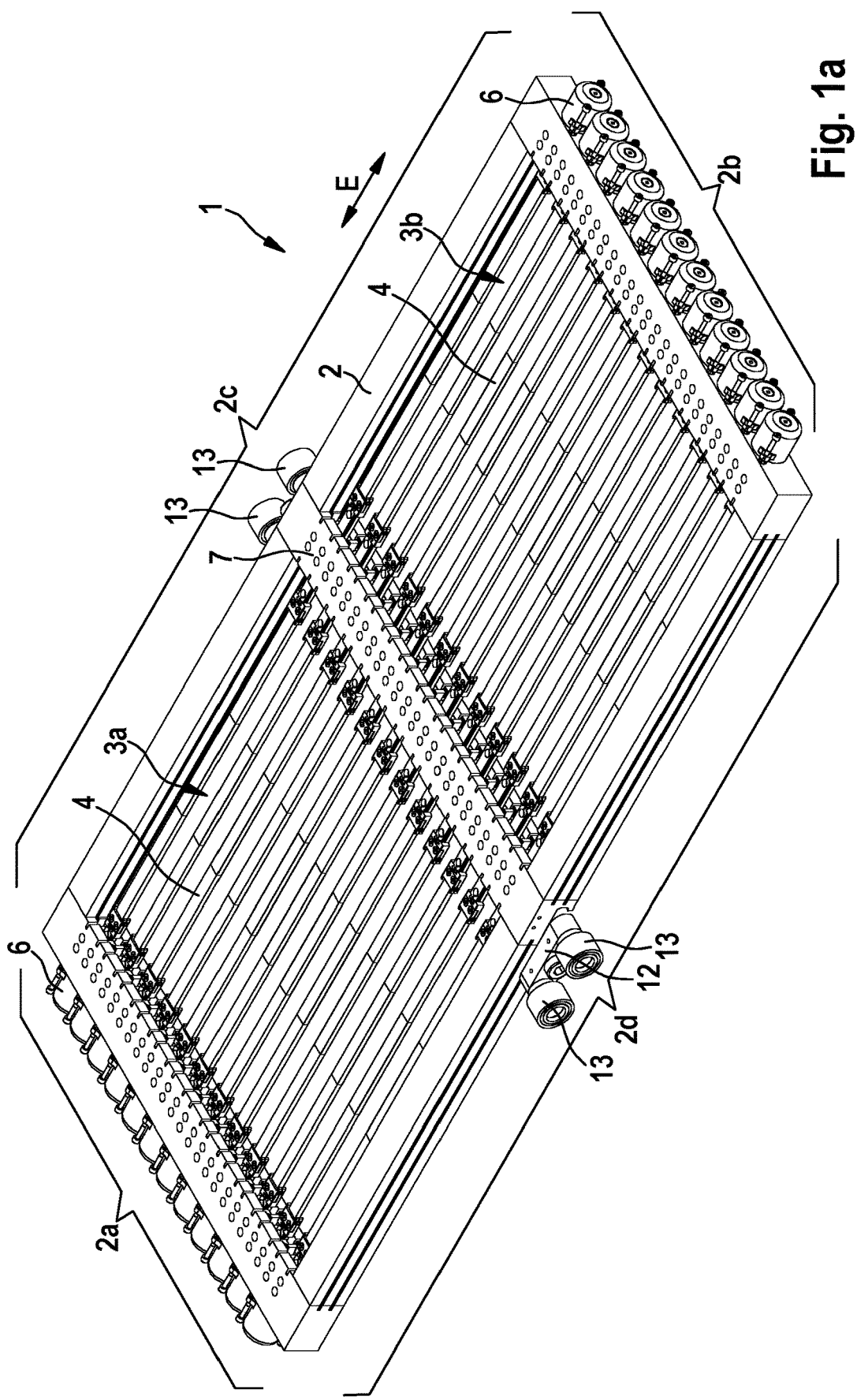

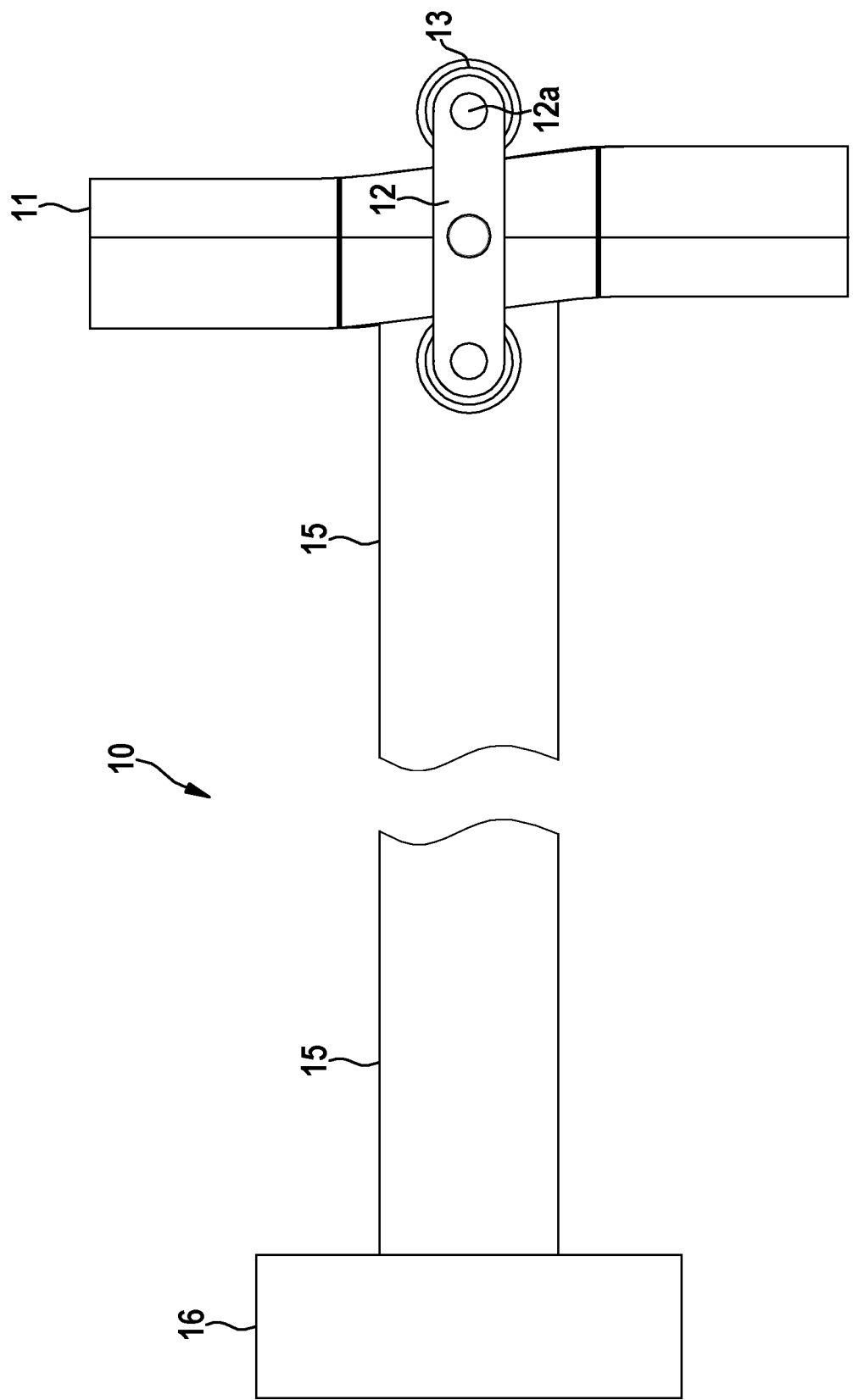

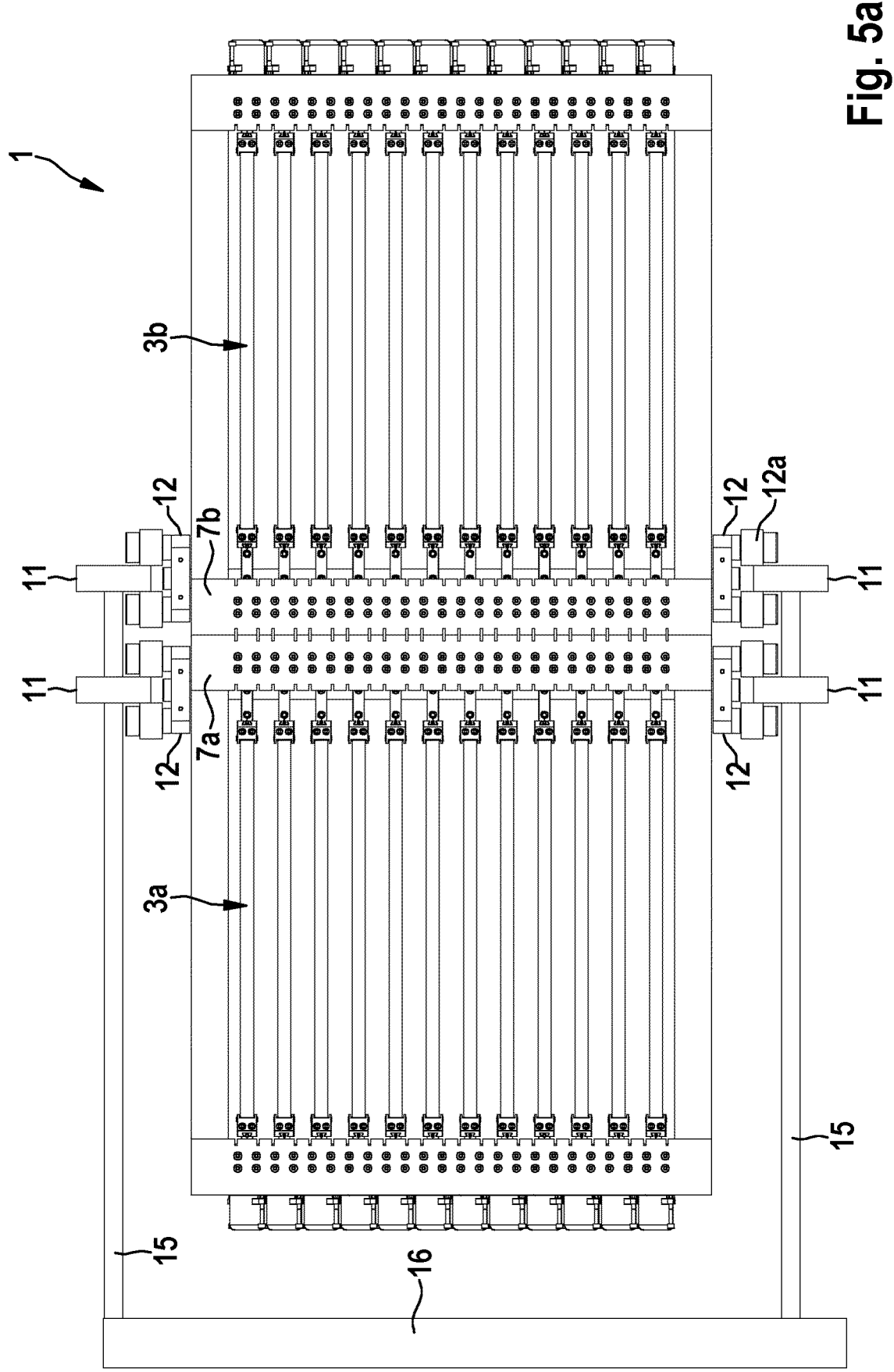

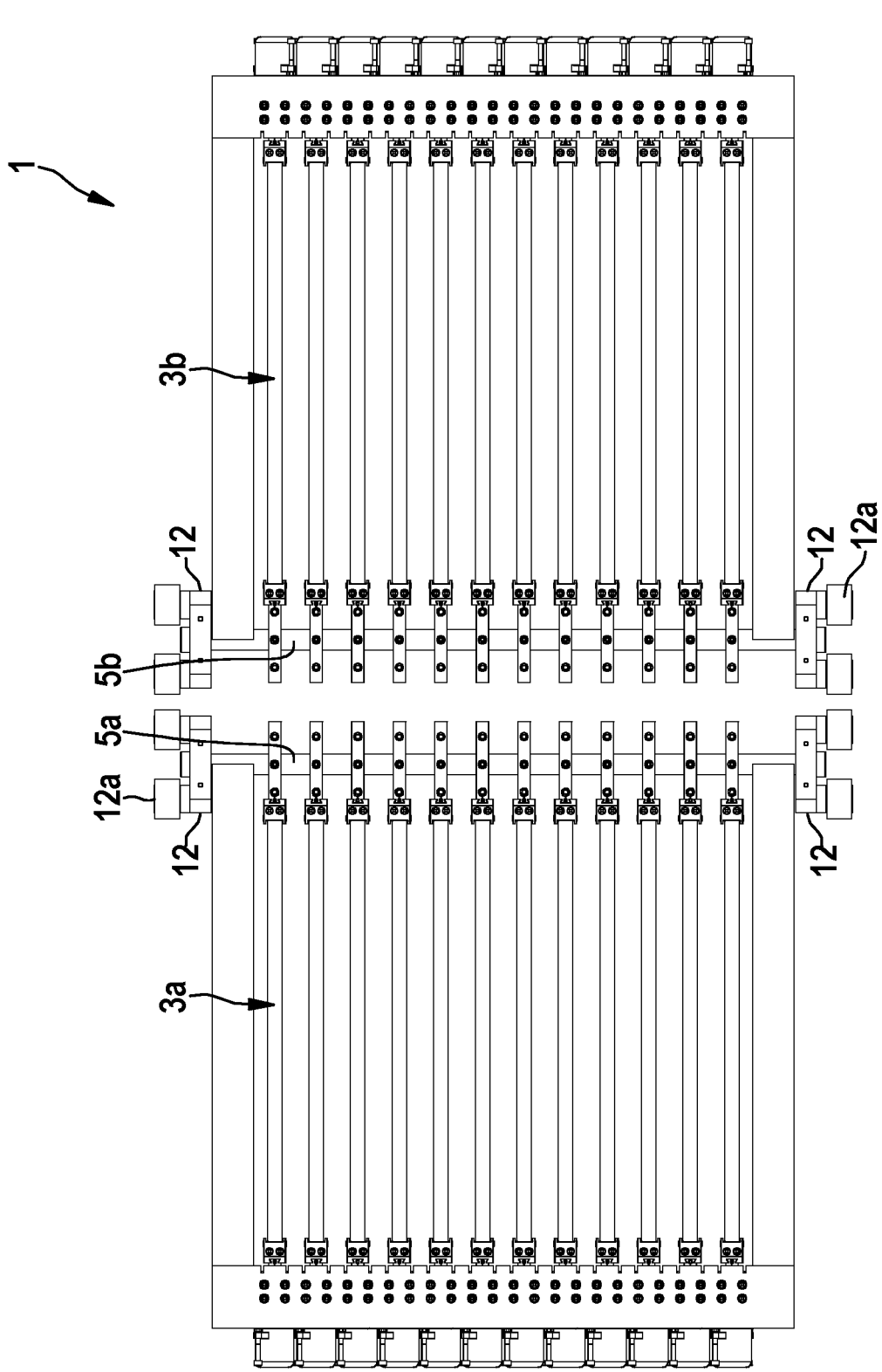

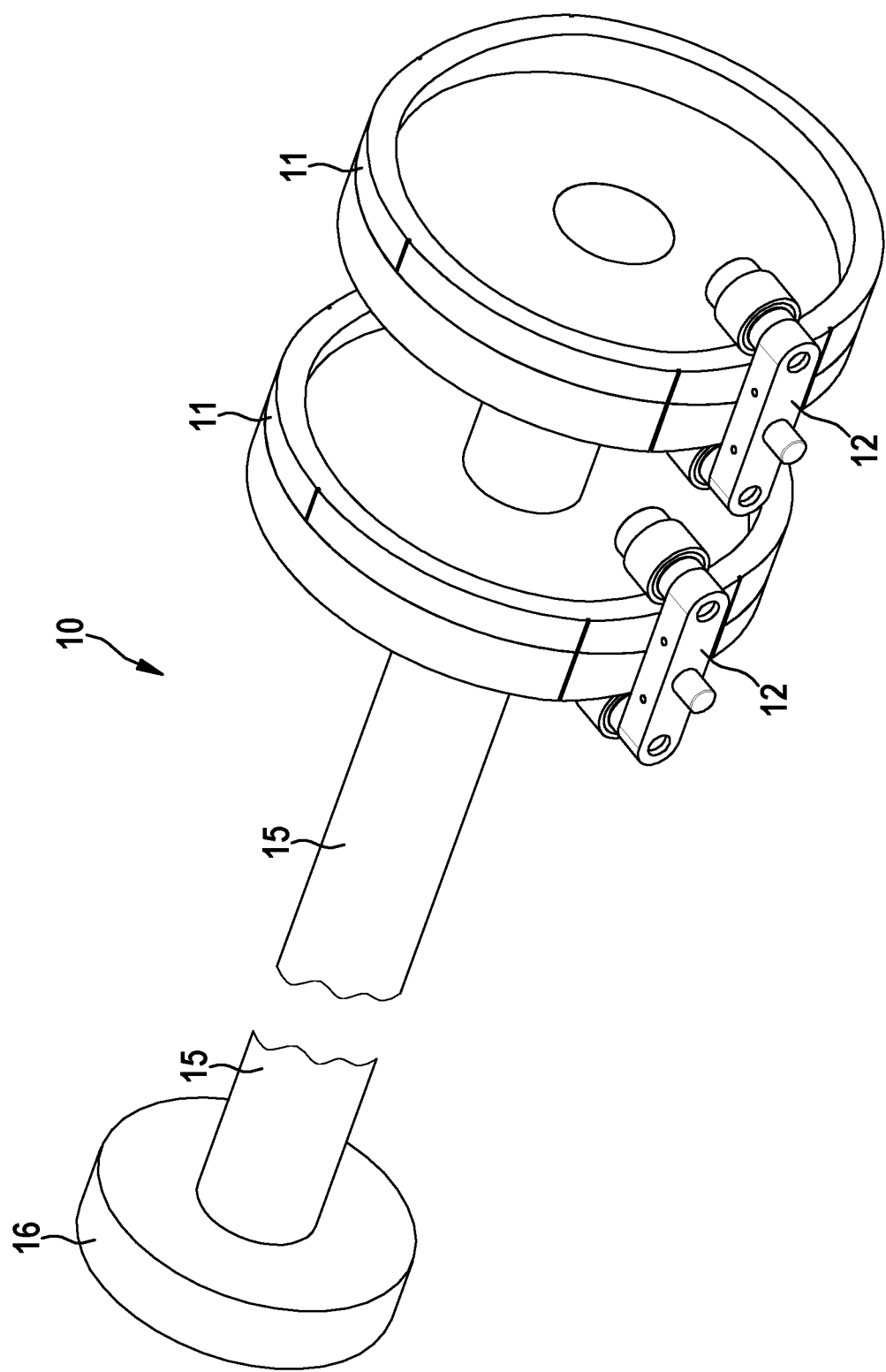

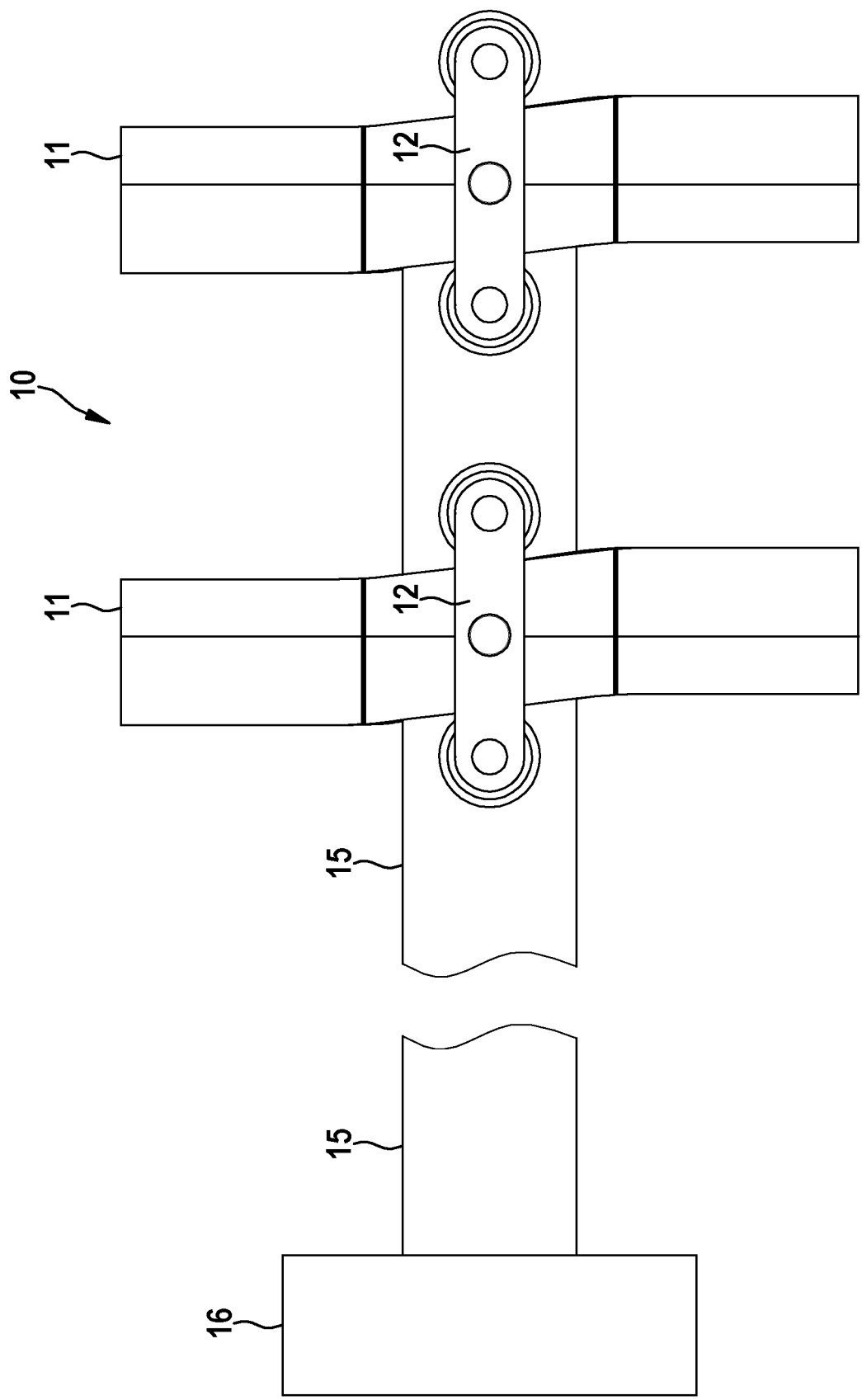

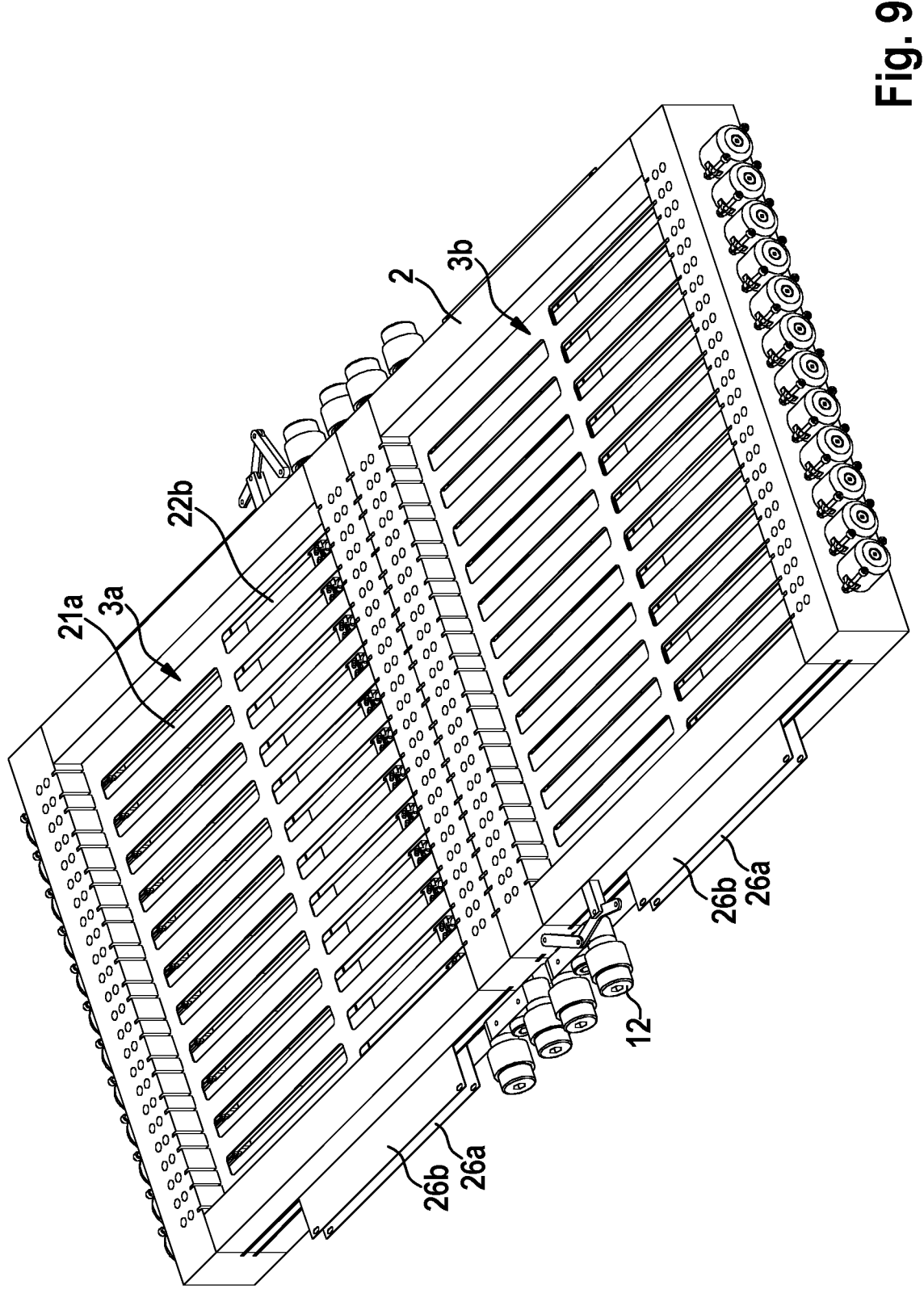

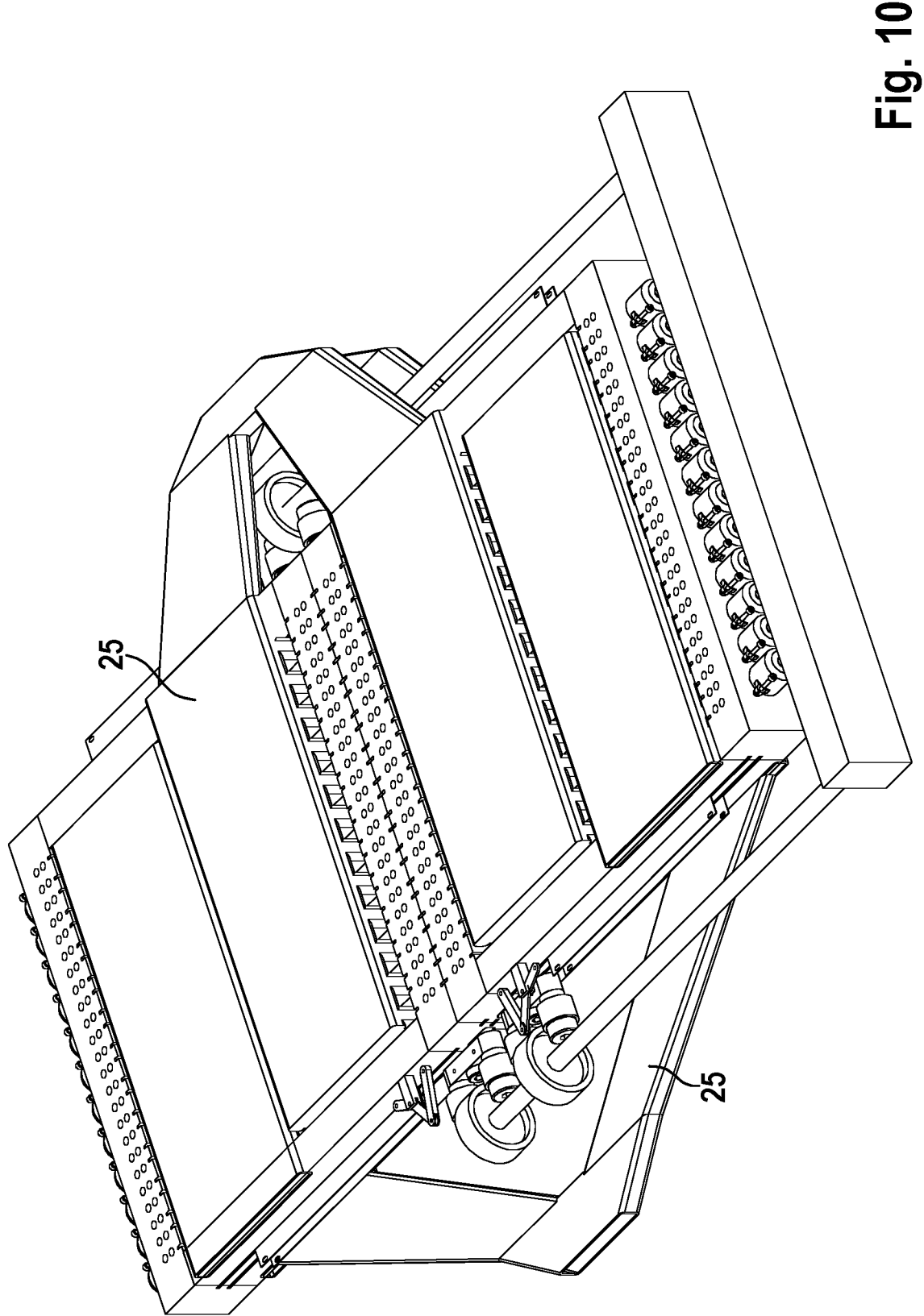

SOLID-STATE-BASED ENERGY CONVERTER, HEATING/COOLING APPARATUS COMPRISING SUCH AN ENERGY CONVERTER, AND METHOD FOR OPERATING A HEATING/COOLING APPARATUS

TECHNICAL FIELD

The present invention relates to solid-state-based energy converters and to heating/cooling apparatuses comprising such energy converters. In particular, the present invention relates to a configuration of such an energy converter.

TECHNICAL BACKGROUND

Solid-state-based energy converters typically utilize caloric effects in ferroic materials in order to reversibly convert mechanical energy into a temperature change. The use of such an energy converter as a heat exchanger in heating and/or cooling apparatuses allows for improved efficiency compared to compression chillers due to the reduced mechanical effort, thereby making it an environmentally friendly technology.

An active element of such an energy converter is usually made of a thermoelastic material, in particular a shape memory alloy, in which a transformation of the microstructure is forced by the action of mechanical energy. Such materials are referred to as thermoelastic, elastocaloric, or mechanocaloric materials. In particular, such materials may release latent heat by being subjected to a tensile, compressive, flexural, torsional or shear load, or may absorb ambient heat in the case of unloading. The resulting temperature changes may thus be used to cool or heat a surrounding medium.

For example, document DE 10 2016 118 776 A1 discloses a thermoelastic energy converter for use in an energy converter system, in which thermoelastic elements are guided in a cylindrical arrangement, such that a synchronous rotation of the thermoelastic elements causes a change in length of the thermoelastic elements, such that a cyclic elastic deformation and relaxation of at least one thermoelastic element is achieved, whereby heat is emitted or absorbed.

However, due to the cylindrical arrangement, the power density of such an arrangement is limited and deteriorates upon higher heating or cooling powers, i.e., in case of a larger cross-sectional area of the thermoelastic elements or larger cylinder diameters.

Document WO 2017/097989 A1 discloses a method of operating circular process-based systems comprising a hot-side reservoir and a cold-side reservoir for a fluid and at least one heat transfer unit comprising mechanocaloric material, wherein the mechanocaloric material of the heat transfer unit is arranged in operative connection with the fluid such that heat transfer is performed between the mechanocaloric material and the fluid, wherein the heat transfer between the mechanocaloric material and the fluid occurs substantially by means of latent heat transfer. A change in shape of the mechanocaloric material is caused by a mechanical stress in the mechanocaloric material, such that a change in temperature of the mechanocaloric material is caused. The potential energy contained in the compression of the mechanocaloric material of a first heat transfer unit from the elastic deformation of the mechanocaloric material may be used to compress the mechanocaloric material of a second heat transfer unit.

Therefore, it is an object of the present invention to provide an improved energy converter that has a high power density and is scalable in a high power range.

DISCLOSURE OF THE INVENTION

This object is achieved by the thermoelastic energy converter according to claim 1 as well as by the heating and/or cooling apparatus according to the independent claim.

Further embodiments are defined in the dependent claims.

According to a first aspect, there is provided a thermoelastic energy converter, in particular for use in a thermoelastic heating/cooling apparatus or in a combined heat-and-power coupling system, comprising:

an arrangement comprising multiple converter devices, wherein each of the converter devices has one or more thermoelastic elements arranged in a direction of extension;

a loading device, in order to load the thermoelastic elements of each of the multiple converter devices so as to have a temporally variable power curve, a coupling which is designed such that the loading device actuates controls the converter devices in a phase-offset manner with respect to their cyclic loading and unloading.

The coupling may be implemented:

with a converter device which is configured to control the loading device in such a way that the converter devices are controlled in a phase-offset manner, that the thermoelastic elements of the respective converter devices are cyclically loaded and unloaded and thereby cyclically heated and cooled, respectively; or with a force extraction device configured to extract, from the energy converter, mechanical energy, which is provided to the loading device from the converter devices.

Further, the thermoelastic elements may each be arranged parallel to one another within one or more of the converter devices in a frame such that the converter devices form one or more substantially planar heat exchanger planes that are, in particular, entirely contained within the frame.

Further, the multiple converter devices may form at least one substantially planar heat exchanger plane each comprising multiple converter devices, wherein the converter devices of a heat exchanger plane are in particular entirely contained within a common frame.

It is a concept of the above energy converter to mutually load and unload thermoelastic elements of multiple converter devices by a common coupling, such that a mutual heat output and heat absorption is performed in the converter devices. The converter devices each have a planar arrangement of the thermoelastic elements such that media may be supplied to and discharged on both sides in a simple manner without significant design effort. In particular, this allows media to be guided along or transversely to the thermoelastic elements in such a way that heat transfer is possible over a large part of the surface of the thermoelastic element, and allows to achieve a correspondingly improved heat exchange characteristic. Due to the planar arrangement of the converter devices, cascading is possible by simply stacking the energy converters.

The loading and unloading is achieved by direct or indirect mechanical coupling of the thermoelastic elements, such that when the thermoelastic elements of one of the converter devices are unloaded, at least part of the mechanical energy thus released may be used to load the thermoelastic elements of a correspondingly different one of the converter devices. By coupling the thermoelastic elements, it is possible to control them in such a way that the design effort is minimal and the installation space may be used efficiently.

According to one embodiment, the loading device may have a common carriage movably arranged in the frame, which is connected to one of the ends of the thermoelastic elements, such that, in the case of a cyclic translational movement of the common carriage in the direction of extension, an alternating cyclic loading and unloading of the thermoelastic elements of the converter devices is achieved, or such that, in the case of a thermal loading of the thermoelastic elements of the converter devices, a cyclic translational movement of the common carriage in the direction of extension is achieved.

Thus, a direct coupling of the two converter devices may be achieved by means of a common reciprocating carriage. The reciprocating movement of the carriage exerts a tensile force on the thermoelastic elements of one of the converter devices, while the thermoelastic elements of the corresponding other converter device are unloaded, and vice versa. The use of the common carriage results in an integrated energy recovery of mechanical strain energy during a cyclic back-and-forth movement and thus in an improved coefficient of performance. Furthermore, a substantially simultaneous converter operation of both converter devices in an alternating manner is achieved while making the best possible use of the stroke movement of the carriage. Furthermore, by using the carriage, the maximum stroke is generally not limited by geometrical conditions.

Furthermore, the converter device may be configured to move the common carriage cyclically according to a predetermined movement profile, wherein in particular the movement profile is configured to provide, during cyclic operation, load phases for loading one of the converter devices, and hold phases in which substantially no movement of the carriage is performed, and/or to provide, during the cyclic operation, loading phases for loading the converter devices and unloading phases for unloading the converter devices, wherein the loading phases and the unloading phases of the multiple converter devices may have different force characteristics or strain characteristics.

According to a further embodiment, the loading device for each of the converter devices may comprise a carriage movably arranged in the frame, wherein each of the carriages is connected to the respective thermoelastic elements of the associated converter device, such that, in the case of a respective movement profile with a cyclic translational movement of the carriages in the direction of extension, the cyclic loading and unloading of the thermoelastic elements is achieved, or such that, in the case of a thermal loading of the thermoelastic elements of the converter devices, a cyclic translational movement of the respective carriage in the direction of extension is achieved.

An indirect coupling may thus occur by means of the converter device, which has no or only slight self-locking, such that mechanical energy acting by means of one of the converter devices during unloading may be provided to one of the other converter devices for the mechanical loading thereof. Such an arrangement does not require a common carriage, such that separate movement profiles of the reciprocating movement are possible. The movement profiles of the respective carriages may thus be formed in a thermodynamically optimized manner.

In particular, the carriages may be mechanically coupled in order to at least partially use a mechanical energy released when one of the converter devices is unloaded to load another of the converter devices.

In particular, the converter device may be coupled to the carriages to control them according to the respective movement profile, in particular a non-sinusoidal movement profile, wherein in particular the cyclic movement profiles each provide a load phase for loading the respective converter device, a hold phase in which no movement of the respective carriage occurs, and an unloading phase for unloading the respective converter device.

Furthermore, the loading phase and the unloading phase may each have, in sections, linear or other monotonic progressions of the loading and/or unloading or of a movement of the carriages, wherein the linear progressions have, in particular, different gradients, and wherein the other monotonic progressions of the loading and/or unloading or of the movement of the carriages have different gradient progressions.

According to one embodiment, the converter device may comprise at least one cam disc having a respective cam carriage coupled to the respective carriage, the cam disc being engaged with the cam carriage such that a movement of the respective carriage for loading and unloading the thermoelastic elements of the respective converter device, in particular in the direction of extension, is effected by the linkage guide of the cam disc. Thus, the linkage guide profile of the converter device may be configured for a cooling and/or heating power optimized loading and unloading of the thermoelastic elements of the converter devices to achieve a high thermodynamic efficiency (coefficient of performance) of the cooling/heating device.

In this way, the converter device may be coupled to the carriages to control them according to a movement profile, wherein the cyclic movement profiles each have a loading phase for loading the respective converter device, a holding phase in which there is substantially no movement of the respective carriage, and an unloading phase for unloading the respective converter device, in particular the loading phase and the unloading phase each having different gradients of movement of the carriage.

According to a further embodiment, the force extraction may comprise at least one cam disc having a respective cam carriage coupled to the respective carriage, the cam disc being engaged with the cam carriage so as to cause a movement of the respective carriage due to a temperature load to the thermoelastic elements of the respective converter devices, and a rotation of the cam disc due to a linkage guide of the cam disc.

According to a further embodiment, the carriage is driven by a cam drive that allows optimized adaptation of the movement profile of the carriage. In particular, the carriage may thus be guided in a thermodynamically optimized manner.

According to a further aspect, an energy converter system is provided, in particular a heating/cooling system, comprising:
 an arrangement comprising at least one of the above energy converters;
 one or more media supply lines for supplying a gaseous or liquid medium, in particular air or water, to the arrangement, and one or more media discharge lines for discharging the medium from the arrangement,
 a media path switching device configured to pass the medium through one or more of the converter devices selectively along a first or a second media path to separate cooled or heated medium;
wherein the coupling is configured to operate the at least one energy converter in synchronization with a switchover between routing the medium along the first and second medium paths, such that the medium is routed through the arrangement for receiving heat from the thermoelastic elements and for outputting heat to the thermoelastic elements along the first and second medium paths, respectively.

In particular, the coupling may be configured to perform cyclic loading and unloading during operation of multiple energy converters when flowing along the first or the second media path with a time offset with respect to each other with respect to the direction of flow of the medium through the respective media path.

Further, the media path switching device may be provided with at least one media control element to switch between the first media path and the second media path.

It may be provided that the media path switching device is formed with at least a first media supply and a first media discharge for controlling the first media path, and with at least a second media supply and a second media discharge for controlling the second media path.

It may be provided that the first media supply and the first media discharge as well as the second media supply and the second media discharge are arranged on different sides of the energy converter arrangement, wherein in particular the first media supply, the first media discharge, the second media supply and/or the second media discharge are provided at a frame part of the converter devices or in a cover at the surface side thereof.

According to one embodiment, the energy converter arrangement may have multiple energy converters adjacent to each other, such that the first and the second media paths each run through two mutually adjacent converter devices of energy converters, the media supplies and/or the media discharges being arranged on surface sides of the energy converter arrangement or in each case in a frame of the converter devices of the energy converters. This ensures a high scalability, since any number of energy converters may be combined in one arrangement.

Furthermore, the at least one media supply line and/or the at least one media discharge line may have a rectangular, round, oval or triangular opening cross-section.

It may be provided that the first and or second media paths are formed along the direction of extension of the thermoelastic elements, transverse to the direction of extension and in the plane of arrangement of the thermoelastic elements, or transverse to the direction of extension and transverse to the plane of arrangement of the thermoelastic elements.

According to a further aspect, there is provided a method of operating a thermoelastic energy converter, in particular for use in a thermoelastic heating/cooling apparatus or in a combined heat-and-power coupling system, wherein the thermoelastic energy converter comprises an arrangement having multiple converter devices, wherein each of the converter devices has one or more thermoelastic elements arranged in a direction of extension, wherein the thermoelastic elements of each of the multiple converter devices are loaded with a time-variable force progression, wherein the converter devices are controlled in a phase-offset manner with respect to their cyclic loading and unloading.

According to a further aspect, a method for operating an energy converter system, in particular a heating/cooling system, is provided, wherein the energy converter system comprises an arrangement of at least one of the above energy converters, one or more medium supply lines for supplying a gaseous or liquid medium, in particular air or water, to the arrangement, and one or more medium discharge lines for discharging the medium from the arrangement, and a medium path switching device configured to pass the medium through one or more of the converter devices selectively along a first or a second medium path to separate cooled or heated medium, the at least one energy converter being operated in synchronism with a switching between a medium passage by means of the first and the second medium path, such that the medium is passed for receiving heat from the thermoelastic elements and for outputting heat to the thermoelastic elements by means of the first or the second media path, respectively, through the arrangement.

Further, when operating multiple energy converters, the cyclic loading and unloading may be performed with respect to each other in a time-offset manner with respect to the direction of flow of the medium through the respective media path when flowing along the first or the second media path.

BRIEF DESCRIPTION OF THE DRAWINGS

Embodiments are explained in more detail below with reference to the accompanying drawings, wherein:

FIGS. 1a and 1b show schematic representations of an energy converter with a common carriage according to a first embodiment;

FIGS. 2a and 2b show various schematic views of a converter device for the energy converter according to FIG. 1;

FIGS. 5a and 5b show schematic representations of an energy converter with separate carriages according to a second embodiment;

FIGS. 6a and 6b show different schematic views of a converter device for the energy converter according to FIG. 5;

FIG. 9 shows a schematic representation of a heating/cooling arrangement with alternately openable and closable media supply lines and media discharge lines for routing a medium through the converter devices of the energy converter;

FIG. 10 shows a schematic representation of the heating/cooling arrangement of FIG. 9 with media routing arrangements;

DESCRIPTION OF EMBODIMENTS

Figure 1B:
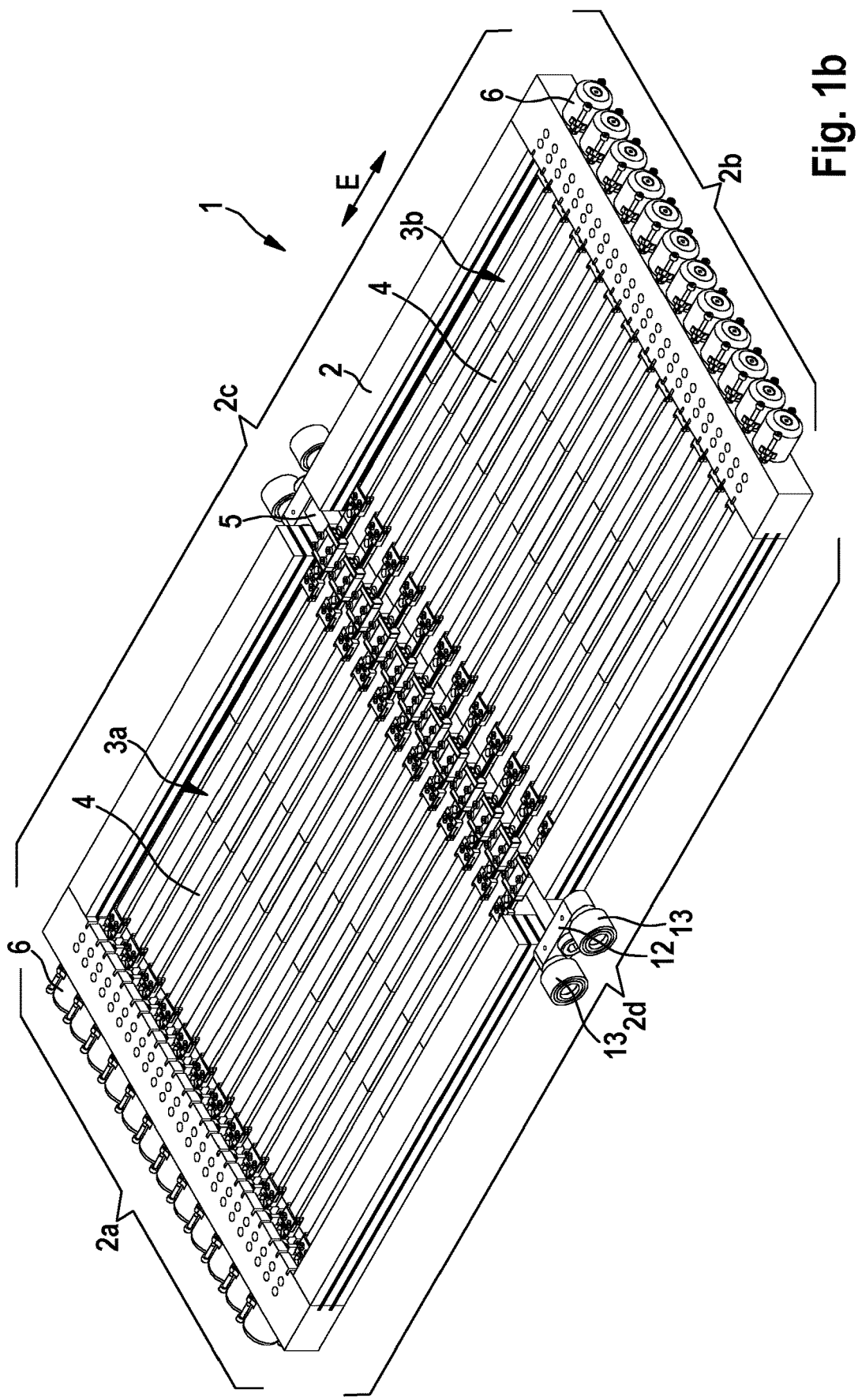

FIGS. 1a and 1b show perspective views of an energy converter 1 having converter devices 3a, 3b arranged in a frame structure of a surrounding frame 2. In the present embodiment, two converter devices 3a, 3b are provided in the common frame 2, but more than two converter devices 3a, 3b may be provided within a common frame 2.

The converter devices 3a, 3b are each formed with a number of thermoelastic elements 4 extending in a direction of extension E from a frame side 2a, 2b of the frame 2 to a carriage 5 translationally movable in the extension direction E. The carriage 5 is provided between further mutually movable elements 4. The carriage 5 is held in a guided manner between further opposite frame sides 2c, 2d and serves as a loading device for loading the thermoelastic elements of each of the multiple converter devices 3a, 3b with a time-variable force curve.

As shown in FIG. 1a, the carriage 5 is held in a guided manner in a bridge part 7. The bridge part 7 serves to separate the converter devices 3a, 3b from each other such that an exchange of a medium between the converter devices 3a, 3b is prevented. Preferably, the bridge part 7 seals the converter devices 3a, 3b from each other. The bridge part 7 is arranged in the frame between the frame sides 2c, 2d and may preferably have the same thickness as the frame sides 2c, 2d.

Figure 2B:
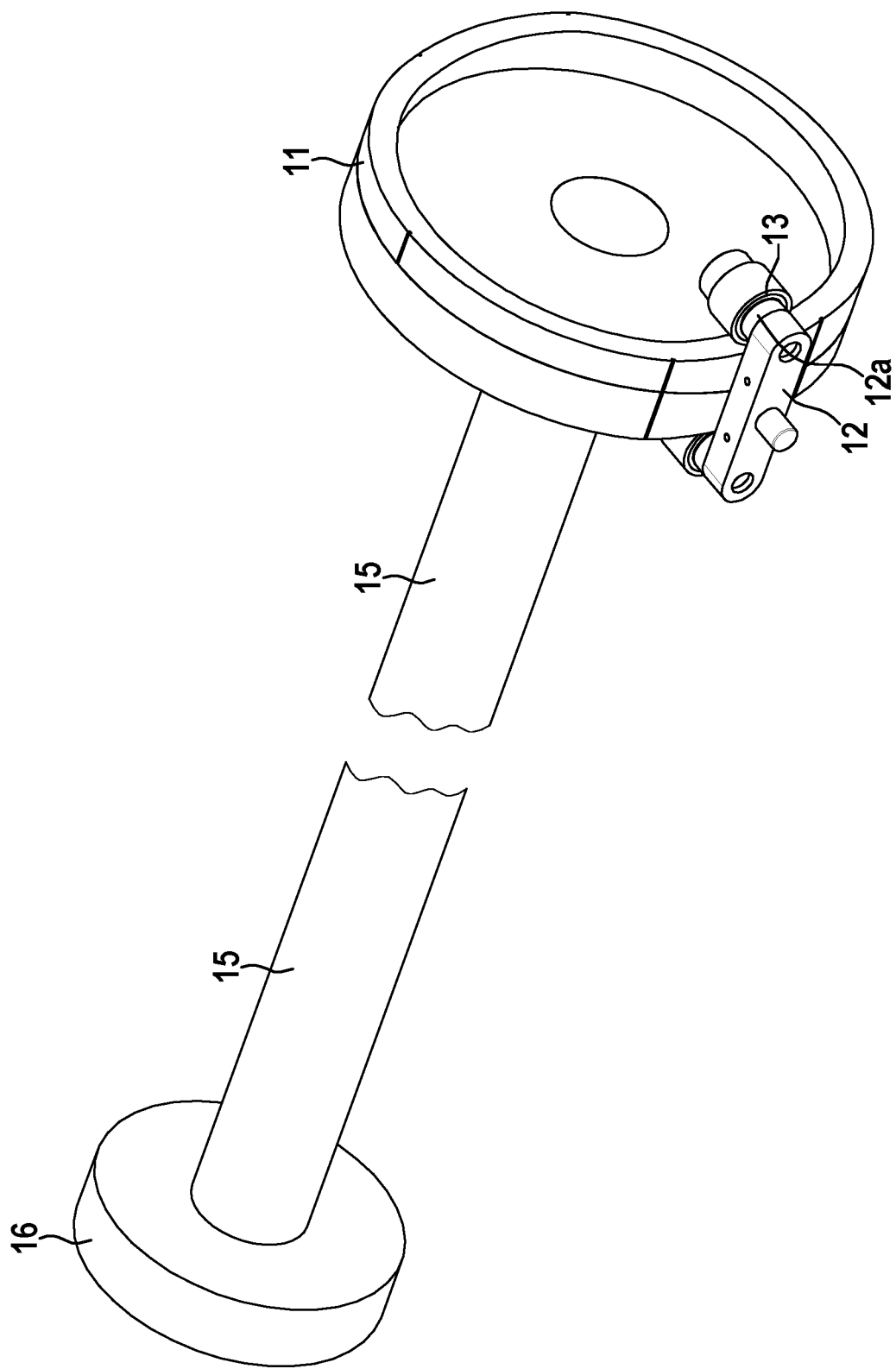

FIGS. 2a and 2b show a converter device 10 which may be used to move the carriage 5. The carriage 5 is respectively held by and moved through a cam carriage 12 of the converter device 10 at its two opposite ends.

For this purpose, the ends of the thermoelastic elements 4 are attached to the frame 2, 2a, 2b and the carriage 5 by means of corresponding retaining elements 6 in such a way that they may be subjected to tensile and, if necessary, compressive loads by a translational movement of the carriage. The retaining elements 6 may ensure easy interchangeability of the thermoelastic elements 4.

For example, the corresponding ends of the thermoelastic elements 4 may be provided with dovetail couplings that may be inserted into corresponding dovetail couplings of the retaining elements 6. The retaining elements 6 may be attached to the frame 2 and/or to the carriage 5 by a length-adjustable connection, such as threaded rod/nut connections, such that by varying the length-adjustable connection, such as tightening the nut, a preload may be imposed on the thermoelastic elements 4.

The thermoelastic elements 4 may be arranged parallel to each other in one or more planes in particular with a direction of arrangement along the frame sides 2a, 2b such that the entire arrangement of the thermoelastic elements 4 is accommodated in the plane of the frame 2 without any protrusion beyond the plane of the frame 2.

The thermoelastic material of the thermoelastic elements 4 may include a shape memory alloy, such as nickel-titanium, and thus release or absorb latent heat through a phase transition, i.e., a transformation of the lattice structure, upon elastic strain or relaxation. Typically, in shape memory alloys subjected to mechanical deformation under force, an austenitic material structure transforms to a martensitic material structure, thereby releasing heat. Upon unloading the material resumes its original shape due to elastic deformation, with the martensitic material structure transforming back into an austenitic material structure and absorbing heat from the environment in the process. Other materials that exhibit a corresponding reversible thermal change in response to an applied mechanical stress field may also be used for herein for the thermoelastic elements 4.

As shown in more detail in FIGS. 2a and 2b with reference to two representations, the converter device 10 may be formed by means of a rotatable cam disc 11 having a linkage guide profile and being in engagement with the cam followers 12 mounted on the carriage 5. The cam followers 12 are arranged on both sides of the carriage 5 and are fork-formed with prongs 12a. The prongs 12a are preferably provided with rollers 13 which enclose the cam disc 11, such that the cam followers 12 follow the linkage guide profile of the cam discs 11 and thereby move the respective carriage 5.

The respective cam disk 11 is arranged on a drive shaft 15, which is driven for rotation by a drive unit 16, such as an electric drive or the like. The coupling of the converter devices 3a, 3b is effected by means of the cam discs 11 and the cam followers 12.

The device may be used generally for heat and cold generation or for a heat-and-power coupling to convert thermal potential differences into mechanical energy.

Figure 3A:
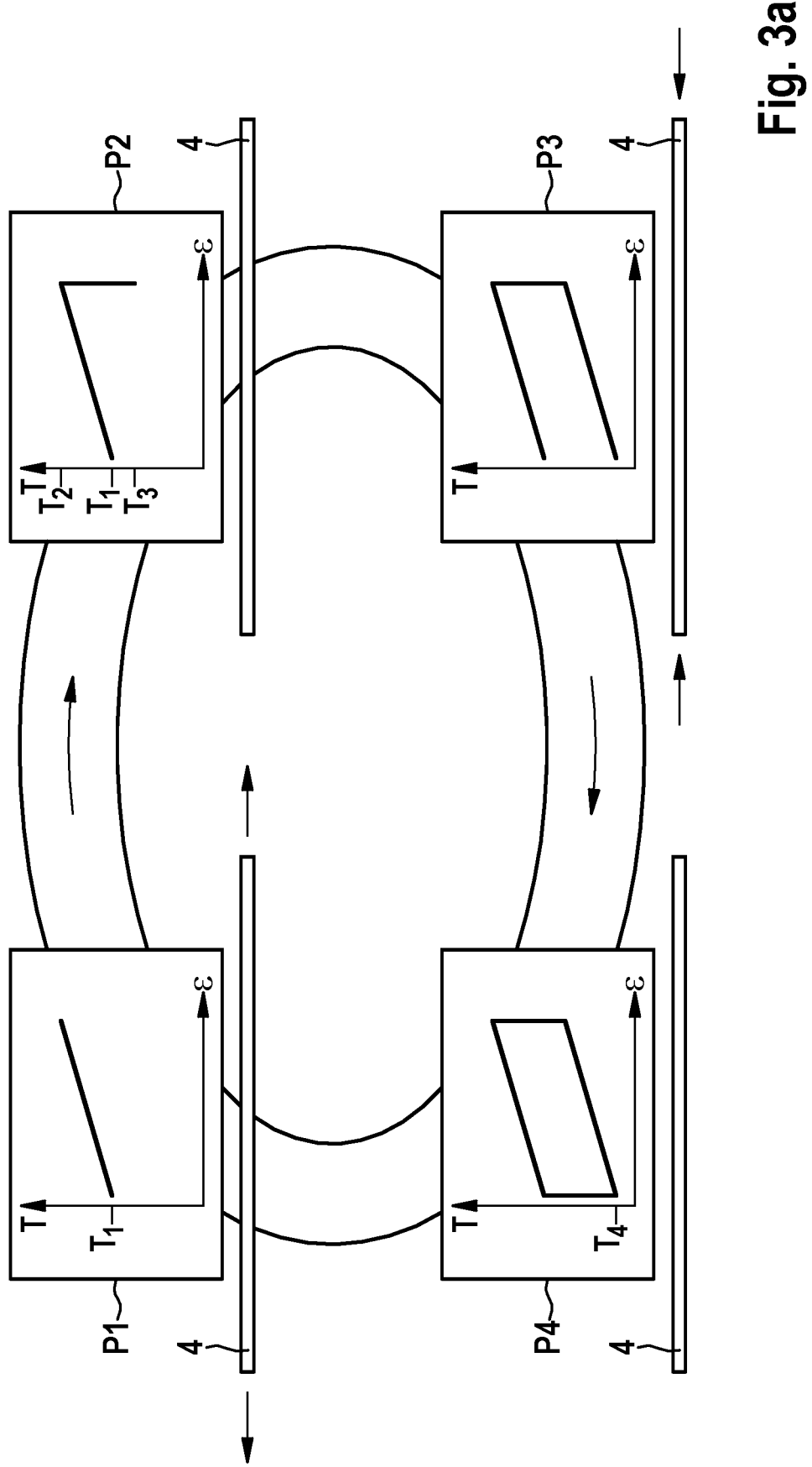
FIGS. 3a and 3b show schematic representations of cyclic processes for heat and cold generation by a phase transition on the basis of a discontinuous process or a process of a combined heat-and-power coupling, respectively.
Figure 3B:
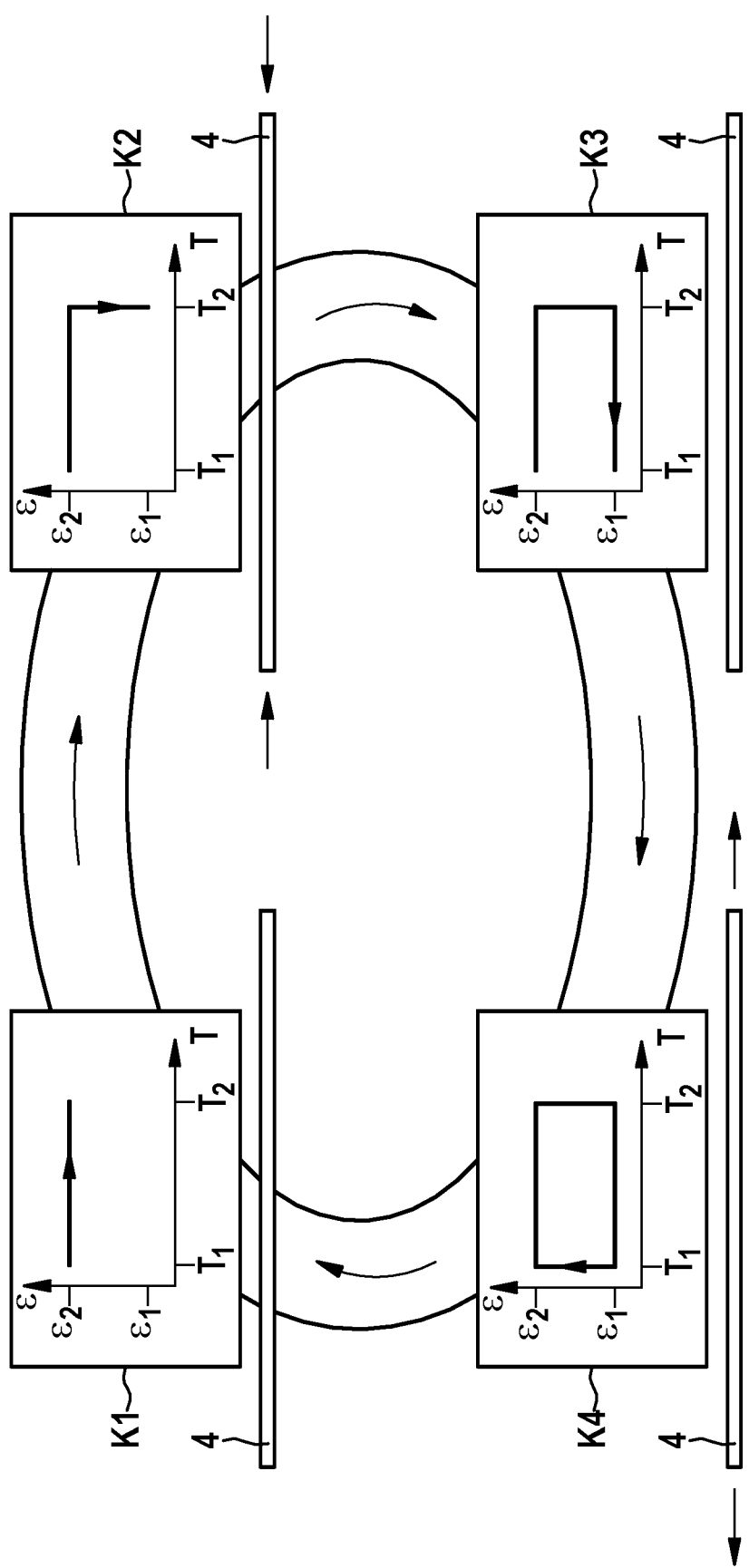

FIGS. 3a and 3b show an adiabatic cycle for heat and cold generation and an adiabatic cycle for a heat-and-power coupling, respectively.

FIG. 3a shows an adiabatic cycle for heat and cold generation by a phase transition of a shape memory material in a discontinuous process. Starting from a phase P1 in which the shape memory material has a temperature T1, latent heat is released during an adiabatic elastic deformation of the shape memory material (the elastic stress E increases), such that the shape memory material heats up to a temperature T2. In a phase P2, while the deformation remains constant, the released heat is dissipated by means of a heat sink such that the temperature of the shape memory material decreases to a temperature T3. In a phase P3, the thermoelastic material is again adiabatically relaxed ($\varepsilon$ decreases), absorbing latent heat such that its temperature decreases and a temperature T4 is reached after the relaxation process, as illustrated in phase P4. By absorbing heat from a heat source, the temperature of the shape memory material is raised back to the initial temperature T1 for the phase P1 process.

FIG. 3b illustrates an adiabatic cycle for a heat-and-power coupling by a phase transition of a shape memory material in a discontinuous process. Starting from a phase K1, in which the shape memory material is heated from a temperature T1 to a temperature T2 in a long configuration, constant strain $\varepsilon 2$, a stressing of the shape memory material is performed. In a phase K2, the shape memory material transforms from martensite (long) to austenite (short) with strain change $\varepsilon 1$ to $\varepsilon 2$ and exerts a mechanical force on the converter device. In phase K3, the material cools from T2 in short configuration $\varepsilon 1$ to T1 and transforms from austenite to martensite. In K4, the material is elongated from $\varepsilon 1$ to $\varepsilon 2$ through the converter device at constant temperature T1. The force required is much less than is supplied to the converter device in K2.

In the following, embodiments for cold or heat generation are described. The thermoelastic elements 4 of the converter devices 3a, 3b are preferably unloaded in one position of the carriage 5 or loaded only with a respective set preload. By displacing the carriage 5 in the direction of extension E of the thermoelastic elements 4 of the converter devices 3a, 3b, these may be alternately loaded and unloaded, in particular stretched and compressed (or unloaded). The carriage 5 is preferably displaced in the direction of extension E in order to avoid a bending load on the thermoelastic elements 4, which may lead to increased material fatigue.

Exerting a tensile force on the thermoelastic elements 4 of one of the converter devices 3a causes them to heat up, while unloading the other converter device 3b causes it to absorb heat from the environment. By means of a converter device 10, the carriage 5 is moved back and forth according to a predetermined movement profile. The movement profile is predetermined by the linkage guide profile of the cam disc 11. The reciprocating movement may be sinusoidal, but the reciprocating movement may be performed according to a non-sinusoidal movement profile that results in thermodynamically optimized heat absorption and heat output.

Figure 4:
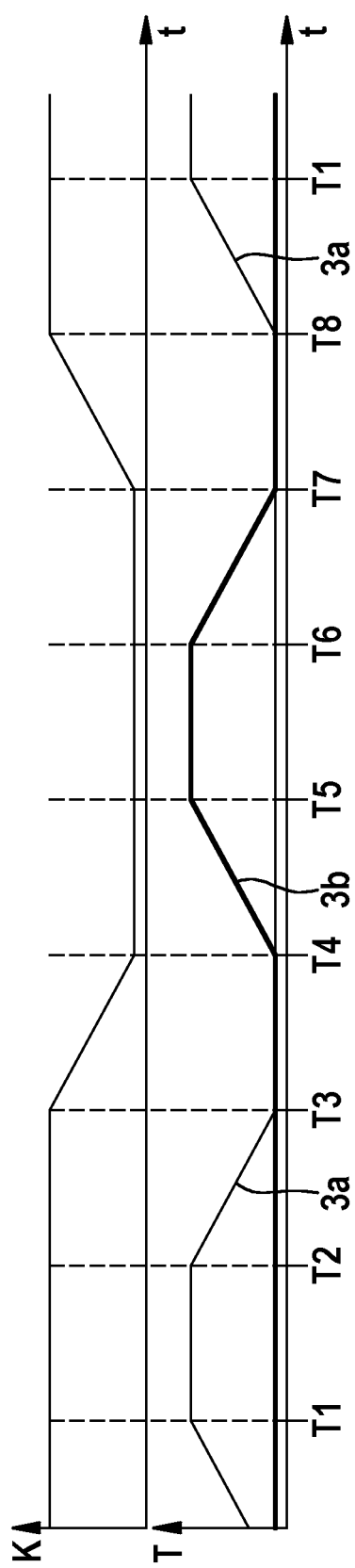
FIG. 4 shows exemplary time curves of a power load to the carriage for a thermodynamically optimized heat output or heat absorption as well as the resulting temperature profile.

FIG. 4 shows an example of a profile of a movement or a power load K of the carriage 5 in a direction of extension E for a thermodynamically improved heat output or heat absorption. One may see the alternation of phases between loading and unloading with intervening holding phases, during which the heat supply or heat output is performed, which is recognizable by the corresponding schematized temperature profile T in the two converter devices 3a, 3b. The loading and unloading is performed alternately due to the common carriage 5.

FIGS. 5a and 5b show an alternative embodiment of the energy converter 1 which, in contrast to the embodiment of FIGS. 1a, 1b, has two separate carriages 5a, 5b, for example arranged next to each other, instead of one carriage 5. For each carriage 5a, 5b, two cam followers 12 are provided, each of which is arranged on both sides of the respective associated carriage 5a, 5b. The carriages 5a, 5b are associated with a respective one of the converter devices 3a, 3b and are held in bridge parts 7a, 7b which ensure that the converter device 3a, 3b is sealed against leakage of the medium.

With this arrangement it is possible to operate the converter devices 3a, 3b according to different loading and unloading profiles, thus achieving improved efficiency of the converter devices 3a, 3b. The cam discs 11 on both sides of the carriages 5a, 5b are preferably mounted on a common drive shaft 15. The arrangement of the cam discs 11 and the respective associated cam followers 12 occurs on both sides of the respective carriage 5a, 5b, such that when the converter device 10 is activated, the resulting movement of the cam followers 12 for each of the carriages 5a, 5b is synchronized with each other.

FIGS. 6a and 6b show in detail two views of the converter device 10 used to control the separate carriages 5a, 5b, which has two cam discs 11 arranged on the drive shaft 15 with mutually offset linkage guide profiles, such that a cyclic movement profile for the two carriages 5a, 5b and thus a thermodynamically optimized heat output or heat absorption for the converter devices 3a, 3b may be set individually.

By coupling the carriages 5a, 5b by means of the cam drive 10, the movements of the two carriages 5a, 5b are coupled to each other such that mechanical energy recovered from elastic deformation, which is released by the linkage guide profile of the cam disk 11 by unloading one of the converter devices 3a, 3b, is transmitted as torque to the drive shaft 15 and may thus be used at least partially to load the thermoelastic elements 4 of the corresponding other converter device 3a, 3b. The coupling of the carriages 5a, 5b is performed by means of the cam followers 12 and the cam discs 11 coupled by means of the shaft 15.

Figure 7:
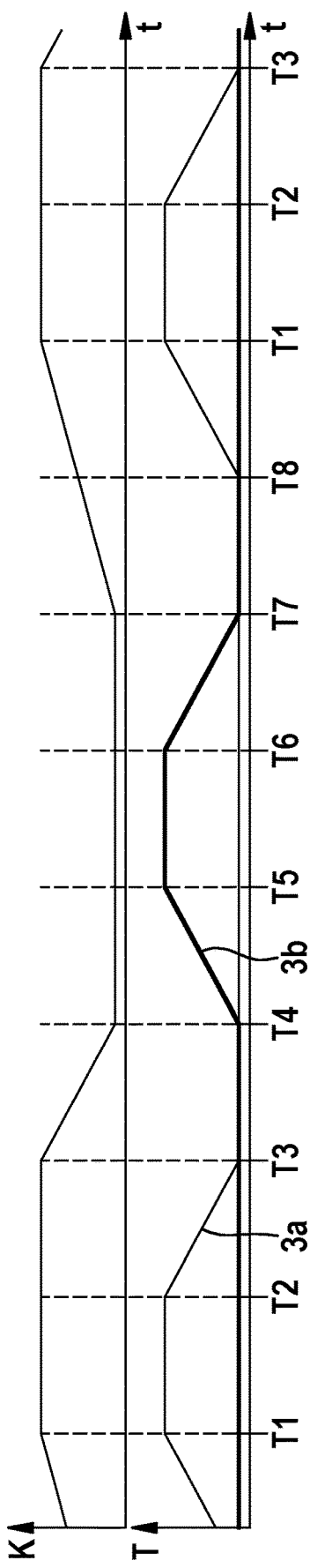
FIG. 7 shows exemplary time curves of a power load to the carriage for a thermodynamically optimized heat output or heat absorption as well as the resulting temperature profile for the energy converter of FIG. 5.

FIG. 7 shows an example of a possible movement profile or load profile of the converter devices 3a, 3b and, shown schematically, the resulting temperature change. It may be seen that by individually controlling the converter devices 3a, 3b, the loading and unloading processes may be realized with different movement profiles. Thus, it may be provided that a movement of the respective carriage 5a, 5b for loading the thermoelastic elements 4 of the respective converter device 3a, 3b is performed with a linear profile according to a lower gradient of the loading or the movement than the linear profile of the unloading or the movement of the respective carriage 5a, 5b for unloading the thermoelastic elements 4. Other non-linear but monotonous gradient profiles are also conceivable.

It is thermodynamically reasonable to provide holding phases between the load and unload phases, which provide a constant load progression or a load progression with a gradient that is very small in magnitude and makes substantially no contribution to heat or cold generation. In other words, in the holding phases, the load progression should be reduced such that heat output from heat generated in the preceding loading phase or heat absorption from heat generated in the preceding unloading phase is effected without additional caloric effects. The holding phase may be correspondingly short if the preceding loading and unloading were so slow that the energy from the latent heats is released directly by the medium without appreciable delay. This is particularly advantageous for isothermal-adiabatic processes.

One or more holding phases may also be provided between several loading phases and/or between several unloading phases. In addition to a linear profile of the load or the movement during a load phase and/or unload phase, this may also have a different profile, whereby the profiles should be monotonous.

Figure 8:
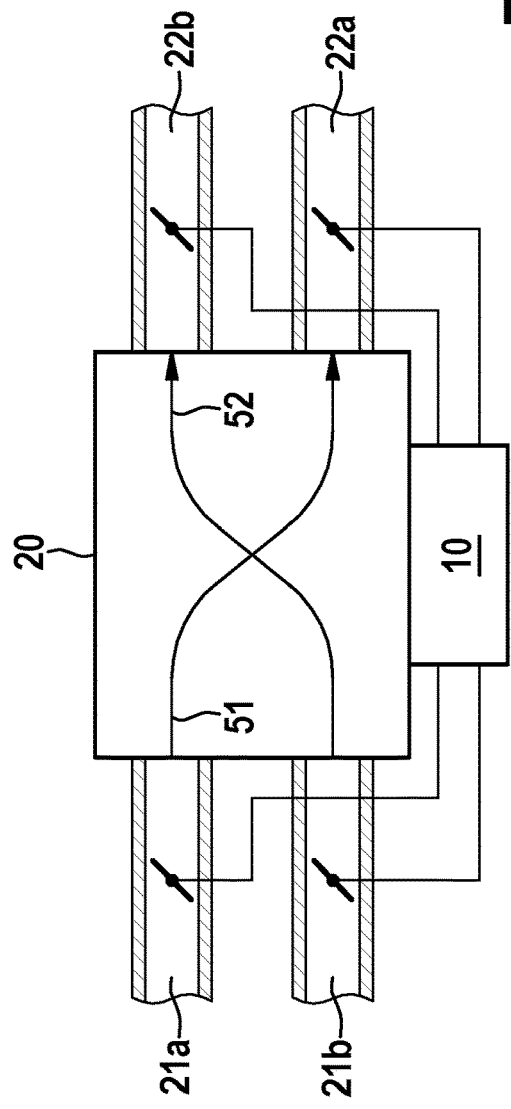
FIG. 8 shows a schematic representation of a heating/cooling arrangement with several switchable media paths.

In FIG. 8, a heating/cooling apparatus 20 is shown schematically. In order to use the energy converter 1 for cooling and/or heating in the heating/cooling apparatus 20, an alternating media routing for heat transport through the converter devices 3a, 3b along different media paths S1, S2 may be provided in order to supply released heat energy to a media flow for its heating and/or to cool it by heat absorption from a medium. For this purpose, for example, a first media supply line 21a for supplying a medium to be heated, in particular air or water, to an arrangement of at least one of the energy converters 1, a first media discharge line 22a for discharging the heated medium from the arrangement, a second media supply line 21b for supplying a medium to be heated, in particular air or water, from the arrangement, and a second media discharge line 22b for discharging the heated medium from the arrangement are provided. Media control elements 23, such as media flaps or media valves, of a media path switching device are provided in each of the media supply lines 21a, 21b and media discharge lines 22a, 22b and are configured to selectively route the medium through the arrangement along a first or a second media path P1, P2.

An exemplary embodiment is shown in FIGS. 9 and 10. The heating/cooling apparatus 20 of FIG. 9 is provided with media control elements 23, each of which is provided with one or more adjustable media supply ports 21a, 21b or media discharge ports 22a, 22b as media routing openings, each of which may be selectively opened.

Preferably, for this purpose, the adjustable media routing openings may be arranged in the frame 2 above and below the converter devices 3a, 3b such that they enclose the arrangement of the thermoelastic elements together with the frame 2. Thus, switching of the media paths S1, S2 is provided by selectively opening or closing one of the media supply ports 21a, 21b or one of the media discharge ports 22a, 22b for each converter devices 3a, 3b.

Also, in one embodiment, the frames 2 of multiple energy converters 1 may be stacked and, accordingly, the media routing ports 21a, 21b, 22a, 22b may be provided only above the uppermost of the converter devices 3a, 3b and below the lowermost of the converter devices 3a, 3b of the energy converters 1. Further, in other embodiments, some of the media routing openings 21a, 21b, 22a, 22b may also be provided between stacked frames 2 of multiple energy converters 1.

In principle, the media path(s) through the energy converter 1 may be provided in such a way that they flow transversely against the thermoelastic elements 4 over their entire length or over a major part of their length in the direction of extension E in order to achieve the fastest possible heat transfer between the thermoelastic elements 4 and the medium. This may be achieved by means of media routing openings 21a, 21b, 22a, 22b on the surface side or on frame parts of the frame 2 extending substantially parallel to the thermoelastic elements 4.

Alternatively, a flow of the medium may also be provided at least partially along the direction of extension of the thermoelastic elements 4. This may be achieved by providing the media routing openings 21a, 21b, 22a, 22b on the holding sides 2a, 2b of the frame on which the thermoelastic elements 4 are held, or by offsetting opposing media routing openings 21a, 21b, 22a, 22b on the surface side or on frame parts of the frame 2 running substantially parallel to the thermoelastic elements 4. This may be advantageous for improving internal media routing during cascading.

As shown in the embodiment of a heating/cooling apparatus in FIG. 9, the media routing openings may be formed, for example, as register orifices, the openings of which, as shown in FIG. 10, are connected to media routing arrangements 25 for supplying a medium to the media supply lines 21a, 21b and discharging it from the media discharge lines 22a, 22b. The media routing arrangements 25 are respectively connected to the one or more media supply ports 21a, 21b and respectively connected to the one or more media discharge ports 22a, 22b through which a media flow is supplied or discharged in operation such that media paths S1, S2 are formed by the arrangement of one or more energy converters 1.

Preferably, the medium for heating is supplied on a first side of the respective converter device 3a, 3b to the first media supply lines 21a and discharged from a second side of the respective converter device 3a, 3b by means of the first media discharge lines 22a. Similarly, the medium for cooling is provided to the second media supply lines 21b on a second side of the respective converter device 3a, 3b and discharged from a first side of the respective converter device 3a, 3b by means of the second media discharge lines 22b.

The opening and closing of the first and second media supply lines 21a, 21b and media discharge lines 22a, 22b are generally controlled such that a supplied media flows into an area of the respective converter device 3a, 3b, in a surface direction of the converter device 3a, 3b, flows along or transversely to the thermoelastic elements 4, and is discharged by means of the corresponding media routing arrangement 25 by means of the media discharge lines 22a, 22b arranged offset to the media supply lines 21a, 21b along the direction of extension E and/or to the direction of arrangement.

As shown in FIG. 9, the media flaps 23 of the media supply lines 21a, 21b and of the 20 may each be configured as a register orifice. This has a fixed sliding aperture 26a with the respective media routing openings 21a, 21b, 22a, 22b and a movable sliding aperture 26b arranged thereon with correspondingly arranged openings, such that depending on the overlapping of the sliding apertures 26a, 26b, on a first side of one of the converter devices 3a, 3b the first media supply lines 21a are open and the second media discharge lines 22b are closed, and on a second side of one of the converter devices 3a, 3b the second media supply lines 21b are closed and the first media discharge lines 22a are open. In particular, it is thus possible to move the movable sliding aperture 26b between two positions in which in each case only one of the media supply openings 21a, 22b is open, while the corresponding other of the media supply lines 21a, 21b is closed.

Figure 11A:
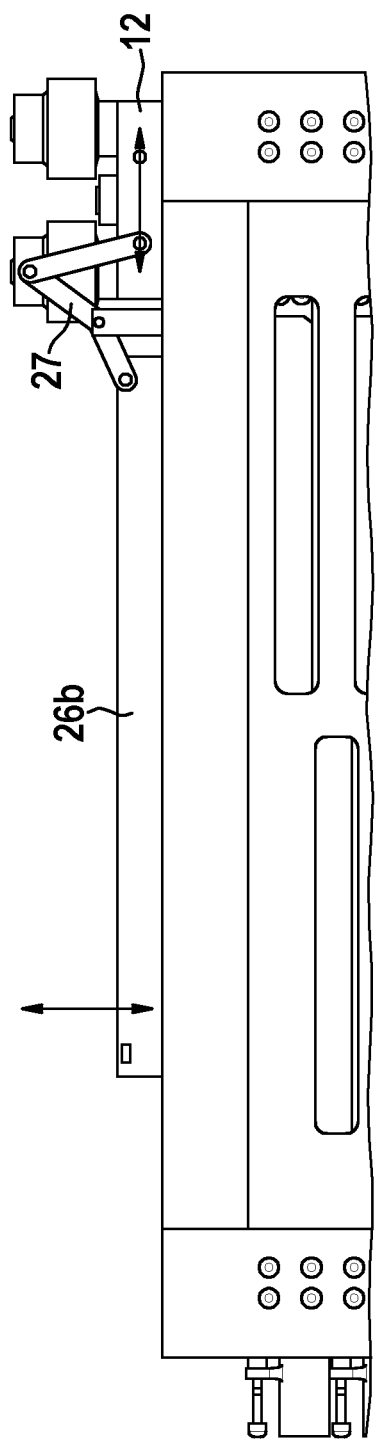
FIGS. 11a and 11b show representations of a mechanical coupling of the actuating movement of a movable sliding shutter by the converter device.
Figure 11B:
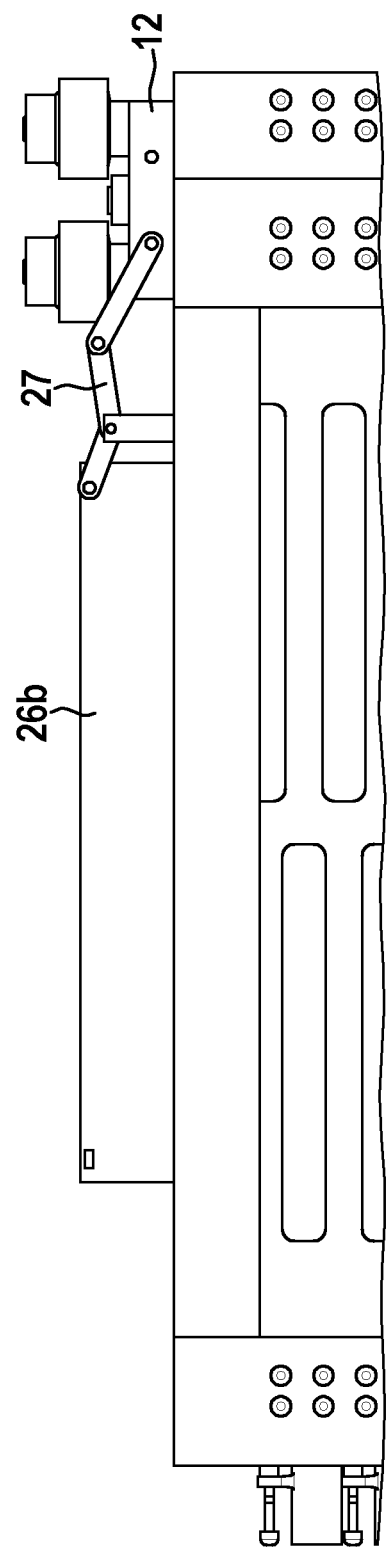

The control of the media routing openings 21a, 21b, 22a, 22b or the actuating movement of the movable sliding aperture 26b may be performed by the converter device 10 or the cam followers 12 coupled thereto. For example, as shown in the two opening positions in FIGS. 11a and 11b, the movable sliding aperture 26b may be coupled to the cam carriage 12 by a suitable mechanical coupling, such as by the lever arrangement 27, such that the opening and closing cycle of the media routing openings 21a, 21b, 22a, 22b is synchronized with the heating and cooling (loading and unloading) of the thermoelastic elements 4 of the respective converter device 3a, 3b.

The opening and closing of the media supply lines 21a, 21b and media discharge lines 22a, 22b thus is performed in accordance with the loading and unloading of the thermoelastic elements 4 of the relevant converter device 3a, 3b and may be controlled accordingly by means of the common converter device 10. Alternatively, the opening and closing of the media supply lines 21a, 21b and media discharge lines 22a, 22b may be effected by means of a separate control which is synchronized to the profile of loading and unloading of the thermoelastic elements 4.

In an alternative embodiment, the opening and closing of the media supply lines 21a, 21b and media discharge lines 22a, 22b may also occur alternately with respect to the sides of the respective converter device, i.e. for heating the medium, the supply and discharge openings on a first side are open at the same time, while the medium supply lines 21a, 21b and medium discharge lines 22a, 22b of the opposite second side of the respective converter device 3a, 3b are closed, and for cooling the medium, the media supply ports 21a, 21b and media discharge ports 22a, 22b on the second side are simultaneously opened, while the media supply ports 21a, 21b and media discharge ports 22a, 22b of the opposite first side of the converter device 3a, 3b are closed.

The arrangement of the simultaneously opened media supply lines 21a, 21b and media discharge lines 22a, 22b should be offset in the surface direction of the converter device in order to allow the best possible heat output or supply to the thermoelastic elements 4. In particular, the media supply lines 21a, 21b and media discharge lines 22a, 22b may be arranged to achieve a flow of the media along the direction of extension of the thermoelastic elements 4 or transversely thereto.

Figure 12A:
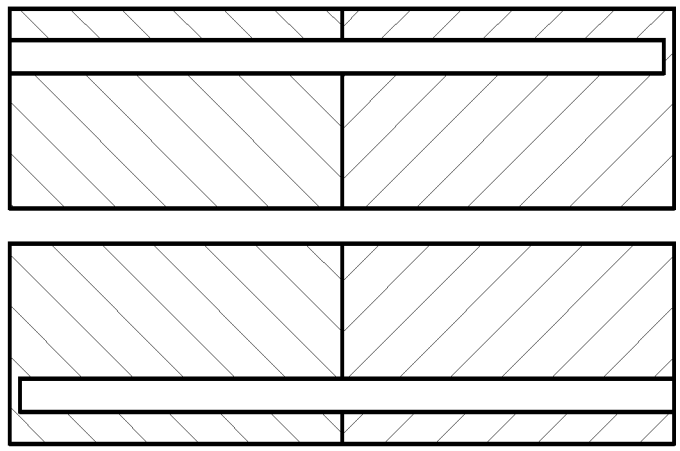
FIGS. 12a to 12c show various embodiments for the cross-sections of media routing openings.
Figure 12B:
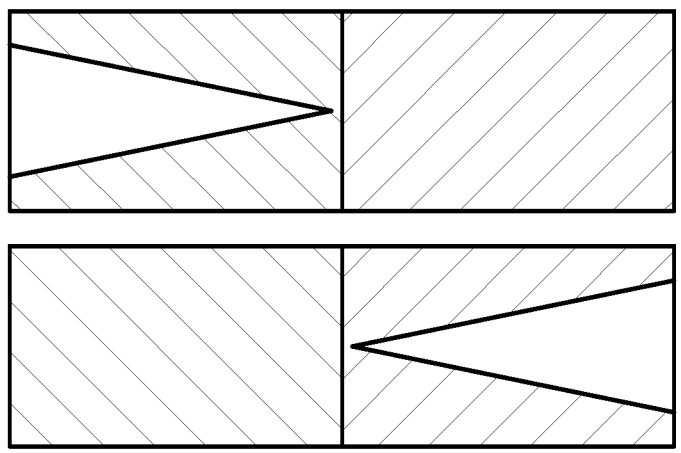
Figure 12C:
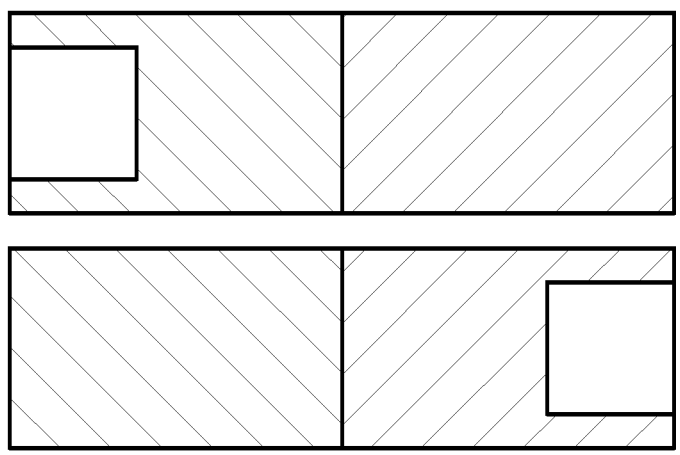

FIGS. 12a to 12c show various embodiments for the cross-sections of media routing openings. For example, FIG. 12a shows a corresponding media supply opening extending over a major part of the length (>80%) of a thermoelastic element 4 in its direction of extension E. The media supply lines 21a, 21b and media discharge lines 22a, 22b at the first side and the second side of the respective converter device 3a, 3b are offset transversely to the direction of extension, such that a flow through the respective converter device 3a, 3b is effected transversely to the direction of extension E.

Furthermore, FIG. 12b shows a triangular-formed media supply opening which extends over approximately one half of the length of the thermoelastic elements 4 in their directions of extension E. The media supply lines 21a, 21b and media discharge lines 22a, 22b at the first side and the second side are offset with respect to the direction of extension, such that a flow through the respective converter device 3a, 3b is effected at least partially along the direction of extension, the flow resistance being uniform due to the triangular cross-section of the media routing.

Furthermore, FIG. 12c shows a rectangular media routing opening which extends over approximately less than half of the length of the thermoelastic elements 4 in their directions of extension E. The media routing openings at the first side and the second side are offset over the extension direction E, such that a flow through the respective converter device 3a, 3b is effected along the extension direction.

Figure 13:
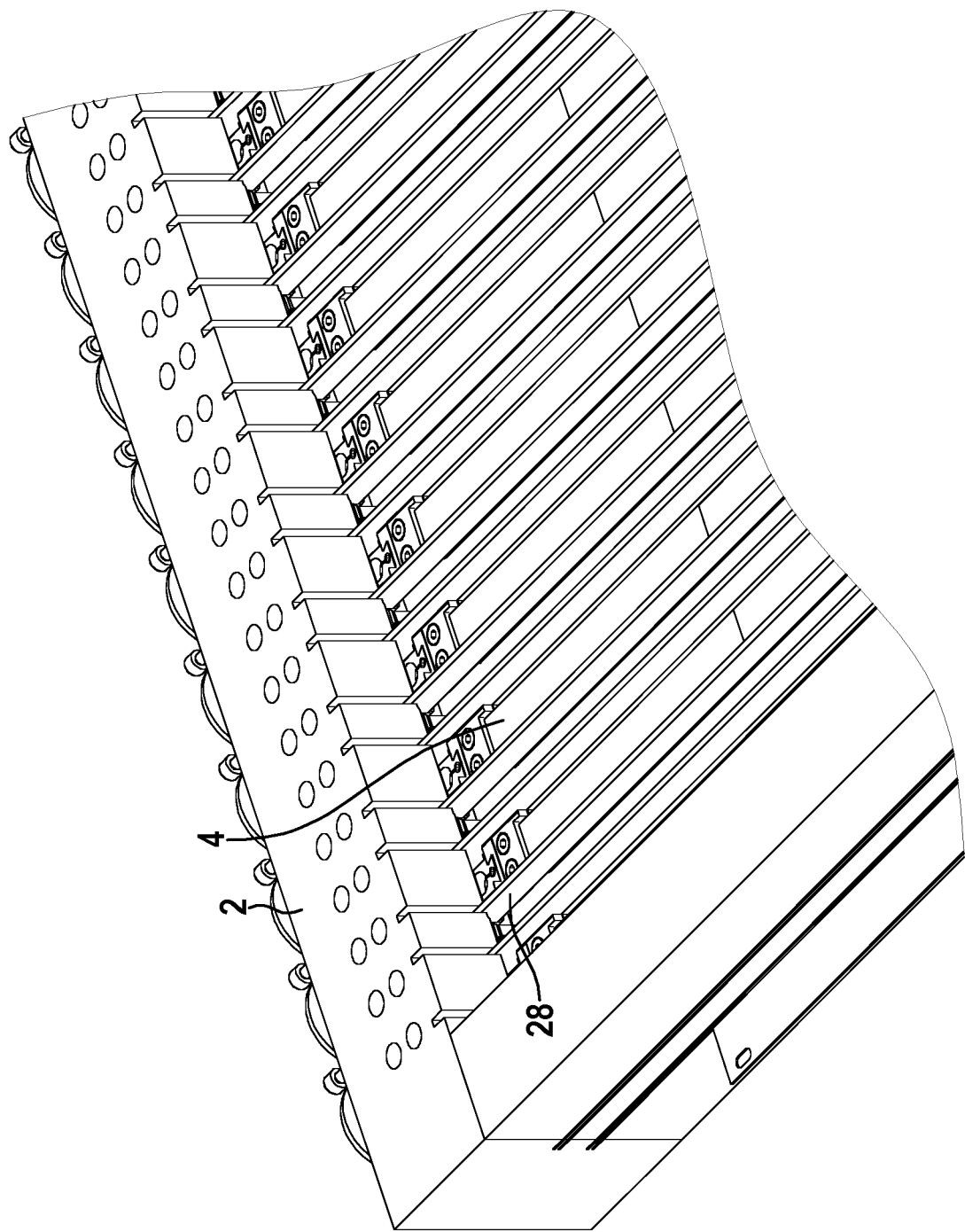
FIG. 13 is a schematic representation of an energy converter with partition walls arranged between the thermoelastic elements.

As shown in FIG. 13, partition walls 28 may be arranged between thermoelastic elements 4, which extend in the direction of extension. These serve to guide the media inside the energy converter 1 and force the media flow to run in the direction of extension of the thermoelastic elements 4 in order to achieve improved heat input or heat output.

In principle, the media supply lines 21a, 21b and media discharge lines 22a, 22b may be provided on all sides of the converter devices 3a, 3b. Thus, the media supply openings may also run through the frame 2 to the thermoelastic elements 4. Overall, the converter devices 3a, 3b are each located within a closed volume through which the media paths S1, S2 run. In this case, the media routing openings are arranged such that media paths extend past at least a majority of the thermoelastic elements 4 to maximize thermal transfer between the media and the thermoelastic elements 4.

Figure 14:
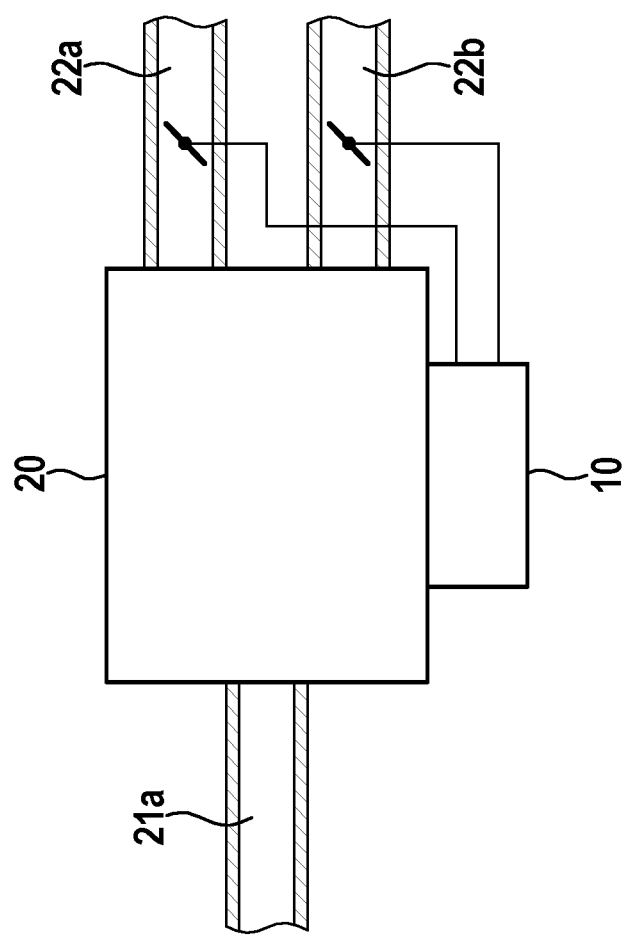
FIG. 14 shows a schematic representation of a heating/cooling arrangement with multiple switchable media paths.

In an alternative embodiment, shown schematically in FIG. 14, the media paths may have a common media supply line and separate media discharge lines 22a, 22b provided with corresponding media control elements 23. The media flaps are operated synchronously with the control of the converter devices 3a, 3b by the converter device 10 to discharge heated or cooled media, respectively.

Alternatively, a common media discharge line may be provided having a switchable branch to direct heated and cooled media columns in separate discharge paths after passing through the arrangement of one or more energy converters 1.

Figure 15:
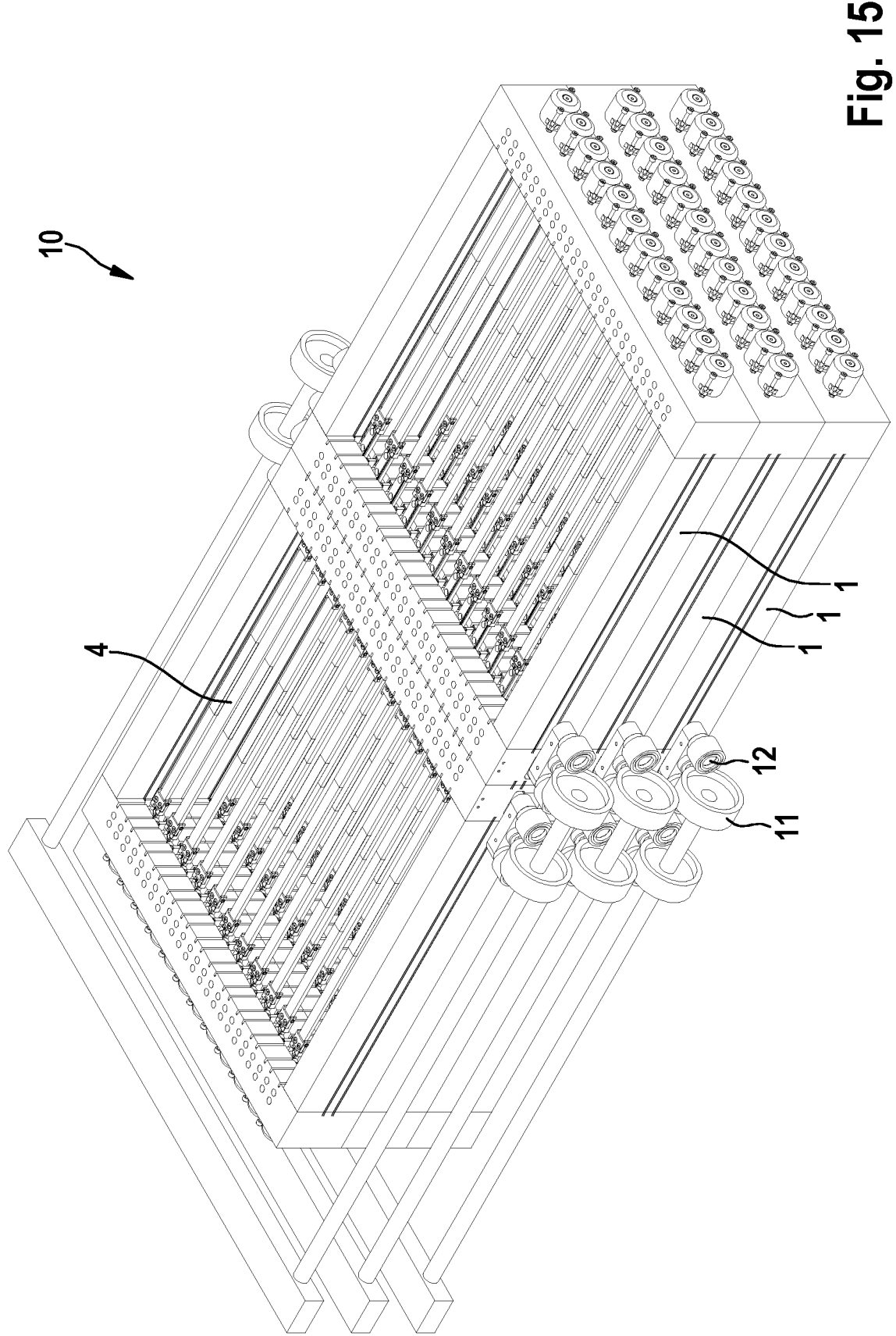
FIG. 15 shows an arrangement of stacked energy converters for cascading the converter devices.

Furthermore, as shown in the energy converter system 20 of FIG. 15, it is possible to stack multiple energy converters 1 such that their frames 2 are arranged on top of each other. Only the upper and lower sides of the stacking arrangement may then be provided with the correspondingly controllable media supply lines 21a, 21b and media discharge lines 22a, 22b, such that a flow through the converter devices 3a, 3b is achieved transversely to their surface direction.

Alternatively, the media path through such a stacking arrangement may also be meandering, running transversely to the direction of extension of the thermoelastic elements 4 or along their direction of extension. The media paths may also be tapped to supply or discharge media.

By stacking the energy converters 1, the performance of the heating/cooling apparatus may be significantly increased. Due to the possibility of stacking and the configuration possibilities by the number of thermoelastic elements 4 and their length, the size of such a heating/cooling apparatus 20 is adaptable without significantly deteriorating the power density in relation to the construction volume.

In the arrangement of the media routing openings in the frame 2, when the upper and lower sides are closed, a lateral arrangement of the frames may also be provided, in which the converter devices 3a, 3b of the energy converter 1 are successively flowed through for heating or cooling the media flow.

In the energy converter system 20, the coupling may be configured to operate the operation of the at least one energy converter in synchronism with a switchover between a media flow by means of the first and the second media paths S1, S2, such that the media is flowed through the arrangement for receiving heat from the thermoelastic elements 4 and for outputting heat to the thermoelastic elements 4 by means of the first and the second media paths S1, S2, respectively.

In particular, the coupling may be configured to perform the cyclic loading and unloading during operation of multiple energy converters when flowing through along the first or the second media path S1, S2 offset in time with respect to each other with respect to the flow direction of the medium through the respective media path. In this way, depending on the flow velocity of the medium during alternation between heating and cooling phases, the medium remaining within the arrangement may first be pressed out and the converter devices 3a, 3b may only be activated, i.e. loaded or unloaded, when the medium to be heated or cooled has reached the respective converter device 3a, 3b.

The invention claimed is:

1. A thermoelastic energy converter (1), being used in a thermoelastic heating/cooling apparatus or in a combined heat-and-power coupling system, comprising:
   an arrangement comprising multiple converter devices (3a, 3b), wherein each of the converter devices (3a, 3b) has one or more thermoelastic elements (4) arranged in a direction of extension;
   a loading device, in order to load the thermoelastic elements (4) of each of the multiple converter devices (3a, 3b) so as to have a temporally variable power curve,
   a coupling which is configured to actuate the loading device which controls the converter devices (3a, 3b) in a phase-offset manner with respect to their cyclic loading and unloading,
   wherein the thermoelastic elements (4) within one or more of the converter devices (3a, 3b) are each arranged parallel to each other in a frame (2, 2a, 2b, 2c, 2d), such that the converter devices (3a, 3b) form one or more substantially planar heat exchanger planes, which are entirely contained within the frame (2, 2a, 2b, 2c, 2d).

2. Thermoelastic energy converter (1) according to claim 1, wherein the coupling is implemented:
   with a converter device (10) which is configured to control the loading device in such a way that the converter devices (3a, 3b) are controlled in a phase-offset manner, that the thermoelastic elements (4) of the respective converter devices (3a, 3b) are cyclically loaded and unloaded and thereby cyclically heated and cooled, respectively; or
   with a force extraction configured to extract, from the energy converter, mechanical energy, which is provided to the loading device from the converter devices (3a, 3b).

3. Thermoelastic energy converter according to claim 1, wherein the multiple converter devices form at least one substantially planar heat exchanger plane each comprising multiple converter devices, wherein the converter devices of a heat exchanger plane are entirely contained within a common frame (2, 2a, 2b, 2c, 2d).

4. Thermoelastic energy converter (1) according to claim 1, wherein the loading device comprises a common carriage (5) movably arranged in the frame (2, 2a, 2b, 2c, 2d) and connected to one of the ends of the thermoelastic elements (4), such that, in the case of a cyclic translational movement of the common carriage (5) in the direction of extension, an alternating cyclic loading and unloading of the thermoelastic elements (4) of the converter devices (3a, 3b) is achieved, or such that, in the case of a thermal loading of the thermoelastic elements (4) of the converter devices (3a, 3b), a cyclic translational movement of the common carriage (5) in the direction of extension is achieved.

5. Thermoelastic energy converter (1) according to claim 3, wherein the converter device (10) is configured to move the common carriage (5) cyclically according to a predetermined movement profile, wherein the movement profile is configured to provide, during the cyclic operation, load phases for loading one of the converter devices (3a, 3b) and hold phases, in which substantially no movement of the carriage (5) is performed, and/or to provide loading phases for loading the converter devices (3a, 3b) and unloading phases for unloading the converter devices (3a, 3b) during the cyclic operation, wherein the loading phases and the unloading phases of the multiple converter devices (3a, 3b) comprise different force characteristics or expansion characteristics.

6. Thermoelastic energy converter (1) according to claim 1, wherein the loading device for each of the converter devices (3a, 3b) comprises a carriage (5a, 5b) movably arranged in the frame (2, 2a, 2b, 2c, 2d), wherein each of the carriages is connected to the respective thermoelastic elements (4) of the associated converter device (3a, 3b), such that, in the case of a respective movement profile with a cyclic translational movement of the carriages (5a, 5b) in the direction of extension, the cyclic loading and unloading of the thermoelastic elements (4) is achieved or such that, in the case of a thermal loading of the thermoelastic elements (4) of the converter devices (3a, 3b), a cyclic translational movement of the respective carriage in the direction of extension is achieved.

7. Thermoelastic energy converter (1) according to claim 6, wherein the carriages (5a, 5b) are mechanically coupled in order to use a mechanical energy released, when one of the converter devices (3a, 3b) is unloaded, at least partially for loading another of the converter devices (3a, 3b).

8. Thermoelastic energy converter (1) according to claim 7, wherein the converter device (10) is coupled to the carriages in order to control them according to the respective non-sinusoidal, movement profile, wherein the cyclic movement profiles each provide a loading phase for loading the respective converter device (3a, 3b), a holding phase in which substantially no movement of the respective carriage is performed, and an unloading phase for unloading the respective converter device (3a, 3b).

9. Thermoelastic energy converter (1) according to claim 8, wherein the loading phase and the unloading phase each have, in sections, linear or other monotonic progressions of the loading and/or unloading or of a movement of the carriages, wherein the linear progressions have different gradients and the other monotonic progressions of the loading and/or unloading or of the movement of the carriages (5a, 5b) have different gradient progressions, respectively.

10. Thermoelastic energy converter (1) according to claim 5, wherein the converter device comprises at least one cam disk (11) with a respective cam carriage (12) coupled to the corresponding carriage (5, 5a, 5b), wherein the cam disk (11) is engaged with the cam carriage (12) such that, by means of a linkage guide of the cam disk (11), a movement of the respective carriage (5, 5a, 5b) for loading and unloading the thermoelastic elements (4) of the respective converter device (3a; 3b) in the direction of extension (E) of the thermoelastic elements (4), is effected.

11. Thermoelastic energy converter (1) according to claim 8, wherein the converter device comprises at least one cam disk (11) with a respective cam carriage (12) coupled to the corresponding carriage (5, 5a, 5b), wherein the cam disk (11) is engaged with the cam carriage (12) such that, by means of a linkage guide of the cam disk (11), a movement of the respective carriage (5, 5a, 5b) for loading and unloading the thermoelastic elements (4) of the respective converter device (3a; 3b) in the direction of extension (E) of the thermoelastic elements (4), is effected.

12. Thermoelastic energy converter (1) according to claim 5, wherein the force extraction comprises at least one cam disc (11) with a respective cam carriage (12) coupled to the corresponding carriage (5, 5a, 5b), wherein the cam disc (11) is engaged with the cam carriage (12), such that, due to a temperature load on the thermoelastic elements (4) of the respective converter device (3a, 3b), a movement of the respective carriage (5, 5a, 5b) and, by means of a linkage guide, a rotation of the cam disk (11) is effected.

13. Thermoelastic energy converter (1) according to claim 8, wherein the force extraction comprises at least one cam disc (11) with a respective cam carriage (12) coupled to the corresponding carriage (5, 5a, 5b), wherein the cam disc (11) is engaged with the cam carriage (12), such that, due to a temperature load on the thermoelastic elements (4) of the respective converter device (3a, 3b), a movement of the respective carriage (5, 5a, 5b) and, by means of a linkage guide, a rotation of the cam disk (11) is effected.

14. Energy converter system (20) with a heating/cooling system, comprising:
   an arrangement of at least one energy converter (1) according to claim 1;
   one or more media supply lines (21, 21b) for supplying a gaseous or liquid medium, including air or water, to the arrangement, and one or more media discharge lines (22a, 22b) for discharging the medium from the arrangement,
   a media path switching device configured to pass the medium through one or more of the converter devices (3a, 3b) selectively along a first or a second media path (S1, S2) to separate cooled or heated medium;
   wherein the coupling is configured to operate the at least one energy converter (1) in synchronism with a switchover between a media routing by means of the first and the second medium path (S1, S2), such that the medium is routed through the arrangement for receiving heat from the thermoelastic elements (4) and for outputting heat to the thermoelastic elements (4) by means of the first and the second medium path (S1, S2), respectively.

15. Energy converter system (20) according to claim 14, wherein the coupling is configured to perform the cyclic loading and unloading during operation of multiple energy converters (1), when flowing through along the first or the second media path (S1, S2), offset in time with respect to each other with respect to the direction of flow of the medium through the respective media path.

16. Energy converter system (20) according to claim 14, wherein the media path switching device (23) is provided with at least one media control element to switch between the first media path and the second media path (S1, S2).

17. Energy converter system (20) according to claim 16, wherein the media path switching device (23) is provided with at least a first media supply line (21a) and a first media discharge line (22a) for controlling the first media path (S1) and with at least a second media supply line (21b) and a second media discharge line (22b) for controlling the second media path (S2).

18. Energy converter system (20) according to claim 17, wherein the first media supply line (21a) and the first media discharge line (22a) are arranged on different sides of the energy converter arrangement, and the second media supply line (21b) and the second media discharge line (22b) are arranged on different sides of the energy converter arrangement, wherein the first media supply line (21a), the first media discharge line (22a), the second media supply line (21b) and/or the second media discharge line (22b) are provided on a frame part of the frame (2, 2a, 2b, 2c, 2d) of the converter devices (3a, 3b) or in a cover on the surface side thereof.

19. Energy converter system (20) according to claim 16, wherein the energy converter arrangement comprises multiple mutually adjacent energy converters (1), such that the first and the second media paths (S1, S2) each pass through two mutually adjacent converter devices (3a, 3b) of energy converters (1), wherein the media supply lines (21a, 21b) and/or the media discharge lines (22a, 22b) are arranged on surface sides of the energy converter arrangement or in each case in a frame (2, 2a, 2b, 2c, 2d) of the converter devices (3a, 3b) of the energy converters (1).

20. Energy converter system according to claim 17, wherein the at least one first and/or second media supply line (21a, 21b) and/or the at least one first and/or second media discharge line (22a, 22b) has a rectangular, round, oval or triangular opening cross section.

21. Energy converter system (20) according to claim 13, wherein the first and/or the second media path (S1, S2) are formed along the direction of extension of the thermoelastic elements (4), transversely to the direction of extension (E) and in the plane of arrangement of the thermoelastic elements (4), or transversely to the direction of extension and transversely to the plane of arrangement of the thermoelastic elements (4).

22. Method of operating a thermoelastic energy converter (1) according to claim 1, being used in a thermoelastic heating/cooling apparatus or in a combined heat-and-power coupling system, wherein the thermoelastic energy converter comprises an arrangement with multiple converter devices (3a, 3b), each of the converter devices (3a, 3b) having one or more thermoelastic elements (4) arranged in a direction of extension (E);
wherein the thermoelastic elements (4) of each of the multiple converter devices (3a, 3b) are being loaded with a time-variable force profile, wherein the converter devices (3a, 3b) are being driven in a phase-offset manner with respect to their cyclic loading and unloading.

23. Method for operating an energy converter system (20), being used in a heating/cooling system, wherein the energy converter system (20) comprises an arrangement of at least one energy converter (1) according to claim 1, one or more media supply lines (21a, 21b) for supplying a gaseous or liquid medium, including air or water, to the arrangement and one or more media discharge lines (22a, 22b) for discharging the medium from the arrangement, and a media path switching device configured to pass the medium through one or more of the converter devices (3a, 3b) selectively along a first or a second media path to separate cooled or heated medium;
wherein the at least one energy converter (1) is operated in synchronism with a switchover between a media routing along the first and the second medium paths (S1, S2), such that the medium is routed through the arrangement for receiving heat from the thermoelastic elements (4) and for outputting heat to the thermoelastic elements (4) along the first and the second medium paths (S1, S2), respectively.

24. Method according to claim 23, wherein, when operating multiple energy converters (1), the cyclic loading and unloading is performed with a time offset with respect to each other upon flowing through along the first or the second media path (S1, S2) with respect to the flow direction of the medium through the respective media path.

* * * * *